(12) United States Patent
Abraham et al.

(10) Patent No.: US 9,077,498 B2
(45) Date of Patent: Jul. 7, 2015

(54) SYSTEMS AND METHODS FOR COMMUNICATION OF CHANNEL STATE INFORMATION

(75) Inventors: Santosh Paul Abraham, San Diego, CA (US); Simone Merlin, San Diego, CA (US); Sameer Vermani, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 422 days.

(21) Appl. No.: 13/247,047

(22) Filed: Sep. 28, 2011

(65) Prior Publication Data

US 2012/0250543 A1    Oct. 4, 2012

Related U.S. Application Data

(60) Provisional application No. 61/387,542, filed on Sep. 29, 2010, provisional application No. 61/389,495, filed on Oct. 4, 2010, provisional application No. 61/405,283, filed on Oct. 21, 2010, provisional application No. 61/422,098, filed on Dec. 10, 2010, provisional application No. 61/432,115, filed on Jan. 12, 2011, provisional application No. 61/405,194, filed on Oct. 20, 2010, provisional application No. 61/409,645, filed on Nov. 3, 2010, provisional application No. 61/414,651, filed on Nov. 17, 2010.

(51) Int. Cl.
| | | |
|---|---|---|
| *G01R 31/08* | (2006.01) | |
| *H04L 5/00* | (2006.01) | |
| *H04B 7/06* | (2006.01) | |
| *H04L 1/00* | (2006.01) | |
| *H04B 7/04* | (2006.01) | |

(Continued)

(52) U.S. Cl.
CPC ............ *H04L 5/0053* (2013.01); *H04B 7/0626* (2013.01); *H04B 7/0636* (2013.01); *H04L 1/0025* (2013.01); *H04L 1/0026* (2013.01); *H04L 1/0028* (2013.01); *H04L 1/0039* (2013.01); *H04L 5/0007* (2013.01); *H04B 7/0452* (2013.01); *H04W 72/0413* (2013.01); *H04W 88/08* (2013.01)

(58) Field of Classification Search
USPC ......... 370/203, 204–215, 229–240, 310–337, 370/338–350, 351–394, 395.1, 395.3, 370/395.4, 395.41, 395.42, 395.5, 395.52, 370/431–457, 458–463, 464–497, 498–529
See application file for complete search history.

(56) References Cited

U.S. PATENT DOCUMENTS

| | | |
|---|---|---|
| 4,519,068 A | 5/1985 | Krebs et al. |
| 6,674,738 B1 | 1/2004 | Yildiz et al. |

(Continued)

FOREIGN PATENT DOCUMENTS

| | | |
|---|---|---|
| CN | 1665317 A | 9/2005 |
| CN | 1833415 A | 9/2006 |

(Continued)

OTHER PUBLICATIONS

International Search Report and Written Opinion—PCT/US2011/054084—ISA/EPO—Dec. 23, 2011.

(Continued)

*Primary Examiner* — Jung-Jen Liu
(74) *Attorney, Agent, or Firm* — Dang M. Vo

(57) ABSTRACT

Certain aspects of the present disclosure relate to a technique for communicating Channel State Information (CSI) feedback. In some aspects, the CSI feedback is communicated in a very high throughput (VHT) wireless communications system.

41 Claims, 26 Drawing Sheets

(51) Int. Cl.
*H04W 72/04* (2009.01)
*H04W 88/08* (2009.01)

(56) References Cited

U.S. PATENT DOCUMENTS

| | | |
|---|---|---|
| 7,023,880 B2 | 4/2006 | El-Maleh et al. |
| 7,224,704 B2 | 5/2007 | Lu et al. |
| 7,593,347 B2 | 9/2009 | Maltsev et al. |
| 7,889,755 B2 | 2/2011 | Malladi et al. |
| 8,189,619 B2 | 5/2012 | Trainin |
| 2003/0169769 A1 | 9/2003 | Ho et al. |
| 2004/0147223 A1 | 7/2004 | Cho |
| 2005/0138199 A1 | 6/2005 | Li et al. |
| 2006/0034247 A1 | 2/2006 | Gu et al. |
| 2006/0227733 A1 | 10/2006 | Frederiks et al. |
| 2006/0248429 A1 | 11/2006 | Grandhi et al. |
| 2006/0268819 A1 | 11/2006 | Chen et al. |
| 2007/0097945 A1 | 5/2007 | Wang et al. |
| 2007/0129018 A1 | 6/2007 | Trainin et al. |
| 2007/0165736 A1 | 7/2007 | Wang et al. |
| 2007/0195811 A1 | 8/2007 | Basson et al. |
| 2007/0298742 A1 | 12/2007 | Ketchum et al. |
| 2008/0219373 A1 | 9/2008 | Zhang et al. |
| 2008/0267133 A1 | 10/2008 | Shida et al. |
| 2008/0267190 A1 | 10/2008 | Baker et al. |
| 2008/0316981 A1 | 12/2008 | Trainin |
| 2009/0013081 A1 | 1/2009 | Laroia et al. |
| 2009/0031185 A1 | 1/2009 | Xhafa et al. |
| 2009/0070649 A1 | 3/2009 | Aldana et al. |
| 2009/0086690 A1 | 4/2009 | Gu et al. |
| 2009/0143029 A1 | 6/2009 | Matsumoto et al. |
| 2009/0175297 A1 | 7/2009 | Prakash |
| 2009/0185608 A1 | 7/2009 | Blackwell |
| 2009/0207765 A1 | 8/2009 | Yamaura |
| 2009/0207954 A1* | 8/2009 | Dai et al. ............... 375/345 |
| 2009/0238121 A1 | 9/2009 | Kotecha |
| 2009/0290563 A1 | 11/2009 | Gu et al. |
| 2009/0305715 A1 | 12/2009 | Barve et al. |
| 2010/0080173 A1 | 4/2010 | Takagi |
| 2010/0093287 A1 | 4/2010 | Higuchi et al. |
| 2010/0107042 A1 | 4/2010 | Sawai et al. |
| 2010/0118797 A1 | 5/2010 | Park et al. |
| 2010/0128669 A1 | 5/2010 | Chun et al. |
| 2010/0202306 A1 | 8/2010 | Jersenius et al. |
| 2010/0215112 A1 | 8/2010 | Tsai et al. |
| 2010/0226269 A1 | 9/2010 | Chakraborty et al. |
| 2010/0238984 A1 | 9/2010 | Sayana et al. |
| 2010/0248635 A1 | 9/2010 | Zhang et al. |
| 2010/0260060 A1 | 10/2010 | Abraham et al. |
| 2010/0260138 A1 | 10/2010 | Liu et al. |
| 2010/0284393 A1 | 11/2010 | Abraham et al. |
| 2010/0290544 A1 | 11/2010 | Kawamura et al. |
| 2010/0315953 A1 | 12/2010 | Pare, Jr. et al. |
| 2010/0322165 A1 | 12/2010 | Yoo |
| 2010/0322166 A1 | 12/2010 | Sampath et al. |
| 2010/0322337 A1 | 12/2010 | Ylitalo et al. |
| 2010/0329220 A1 | 12/2010 | Kim et al. |
| 2011/0002290 A1 | 1/2011 | Kim et al. |
| 2011/0013547 A1 | 1/2011 | Liao et al. |
| 2011/0039535 A1 | 2/2011 | Baker et al. |
| 2011/0051705 A1 | 3/2011 | Jones et al. |
| 2011/0064146 A1 | 3/2011 | Chen et al. |
| 2011/0069629 A1 | 3/2011 | Breit et al. |
| 2011/0075607 A1* | 3/2011 | Kim et al. ............... 370/328 |
| 2011/0096685 A1 | 4/2011 | Lee et al. |
| 2011/0103280 A1 | 5/2011 | Liu et al. |
| 2011/0110349 A1 | 5/2011 | Grandhi |
| 2011/0110451 A1 | 5/2011 | Tsai et al. |
| 2011/0116487 A1 | 5/2011 | Grandhi |
| 2011/0116488 A1* | 5/2011 | Grandhi ............... 370/338 |
| 2011/0149760 A1 | 6/2011 | Shrivastava et al. |
| 2011/0149927 A1 | 6/2011 | Stacey et al. |
| 2011/0150004 A1 | 6/2011 | Denteneer et al. |
| 2011/0164489 A1 | 7/2011 | Papasakellariou et al. |
| 2011/0176439 A1 | 7/2011 | Mondal et al. |
| 2011/0194650 A1 | 8/2011 | Lee et al. |
| 2011/0199946 A1 | 8/2011 | Breit et al. |
| 2011/0235743 A1 | 9/2011 | Lee et al. |
| 2011/0249578 A1* | 10/2011 | Nayeb Nazar et al. ....... 370/252 |
| 2011/0268088 A1 | 11/2011 | Lindskog et al. |
| 2011/0273977 A1 | 11/2011 | Shapira et al. |
| 2012/0002740 A1* | 1/2012 | Han et al. ............... 375/260 |
| 2012/0026909 A1* | 2/2012 | Seok ............... 370/252 |
| 2012/0027111 A1 | 2/2012 | Vook et al. |
| 2012/0051246 A1 | 3/2012 | Zhang et al. |
| 2012/0063439 A1 | 3/2012 | Seok |
| 2012/0076179 A1 | 3/2012 | Stacey et al. |
| 2012/0106531 A1 | 5/2012 | Seok et al. |
| 2012/0189077 A1 | 7/2012 | Seo et al. |
| 2012/0213310 A1 | 8/2012 | Ko et al. |
| 2012/0243485 A1 | 9/2012 | Merlin et al. |
| 2012/0250618 A1 | 10/2012 | Abraham et al. |
| 2012/0250668 A1 | 10/2012 | Sampath et al. |
| 2012/0250796 A1 | 10/2012 | Sampath et al. |
| 2012/0257567 A1 | 10/2012 | Abraham et al. |
| 2012/0257605 A1 | 10/2012 | Abraham et al. |
| 2012/0257606 A1 | 10/2012 | Sampath et al. |
| 2012/0263116 A1 | 10/2012 | Basson et al. |
| 2012/0275446 A1 | 11/2012 | Stacey et al. |
| 2012/0315859 A1 | 12/2012 | Lee et al. |
| 2012/0320782 A1* | 12/2012 | Seo et al. ............... 370/252 |
| 2013/0010844 A1 | 1/2013 | Amini et al. |
| 2013/0188630 A1 | 7/2013 | Song et al. |
| 2013/0250903 A1 | 9/2013 | Ahn et al. |
| 2013/0260779 A1 | 10/2013 | Sohn et al. |
| 2013/0286925 A1* | 10/2013 | Fischer et al. ............... 370/312 |
| 2014/0016626 A1* | 1/2014 | Dai et al. ............... 370/336 |
| 2014/0369302 A1 | 12/2014 | Abraham et al. |
| 2015/0009899 A1 | 1/2015 | Abraham et al. |

FOREIGN PATENT DOCUMENTS

| | | |
|---|---|---|
| CN | 101273543 A | 9/2008 |
| CN | 101657985 A | 2/2010 |
| CN | 101796880 A | 8/2010 |
| CN | 101841356 A | 9/2010 |
| EP | 1594284 A2 | 11/2005 |
| EP | 1610522 A1 | 12/2005 |
| EP | 2129155 A1 | 12/2009 |
| EP | 2242303 A2 | 10/2010 |
| GB | 2405052 A | 2/2005 |
| JP | H10334615 A | 12/1998 |
| JP | 2005323372 A | 11/2005 |
| JP | 2008092380 A | 4/2008 |
| JP | 2008236431 A | 10/2008 |
| JP | 2008252867 A | 10/2008 |
| JP | 2009118003 A | 5/2009 |
| JP | 2009519617 A | 5/2009 |
| JP | 2009529292 A | 8/2009 |
| JP | 2010041596 A | 2/2010 |
| JP | 2010081360 A | 4/2010 |
| JP | 2010093489 A | 4/2010 |
| JP | 2010109401 A | 5/2010 |
| JP | 2010529775 A | 8/2010 |
| JP | 2011510592 A | 3/2011 |
| JP | 2011517172 A | 5/2011 |
| JP | 2012518359 A | 8/2012 |
| JP | 2013511217 A | 3/2013 |
| JP | 2013541882 A | 11/2013 |
| RU | 2236703 C2 | 9/2004 |
| WO | 0006273 A2 | 2/2000 |
| WO | WO-2006102294 A2 | 9/2006 |
| WO | WO-2007040554 A2 | 4/2007 |
| WO | WO-2007103291 A1 | 9/2007 |
| WO | 07149961 | 12/2007 |
| WO | 2008018039 A2 | 2/2008 |
| WO | 2008093298 A2 | 8/2008 |
| WO | 2009027931 A2 | 3/2009 |
| WO | 2009096757 A2 | 8/2009 |
| WO | WO-2009114631 A1 | 9/2009 |
| WO | 2010074471 A2 | 7/2010 |
| WO | WO-2010095802 A1 | 8/2010 |
| WO | WO-2010102035 A2 | 9/2010 |

(56) References Cited

FOREIGN PATENT DOCUMENTS

| WO | 2010150950 A1 | 12/2010 |
| WO | WO-2011060267 A1 | 5/2011 |
| WO | WO-2012030585 A2 | 3/2012 |

OTHER PUBLICATIONS

Merlin S. et al., "IEEE P802.11. Wireless LANs", 11ac Sounding protocol, Mar. 14, 2011, pp. 1-25.

Robert Stacey (Intel), et al., "IEEE P802.11. Wireless LANs", Proposed TGac Draft Amendment, doc.: IEEE 802.11-10/1361r3, Jan. 18, 2011, pp. 1-154.

Simone Merlin, et al., "VHT Control and Link Adaptation", Submission, doc.:IEEE802.11-11/0040r0, Jan. 18, 2011, pp. 1-15.

Stephens, et al., "IEEE P802.11 Wireless LANs; Joint Proposal: High throughput extension to the 802.11; Standard: MAC", IEEE 802.11-05/1095r4, Jan. 2006, pp. 1-103.

IEEE 802.11n-2009, "IEEE Standard for Information technology—Telecommunications and information exchange between systems—Local and metropolitan area networks—Specific requirements", Part 11: Wireless LAN Medium Access Control (MAC) and Physical Layer (PHY) Specifications, Amendment 5: Enhancements for Higher Throughput, IEEE Standard, IEEE, Piscataway, NJ, USA, Oct. 29, 2009, pp. C1-502, XP017604244.

Liming H., et al., "Partial CSI feedback scheme for subchannel allocation in multiuser OFDM systems," Telecommunications, 2009, ICT'09, International Conference on May 27, 2009, pp. 382-386.

Asai Y., et al., "Update of Interference Management Using Beamforming Technique in OBSS Environment," IEEE802.11-10/1121r0, IEEE mentor,Sep. 13, 2010.

Imashioya R., et al., "Design of Very High Throughput Wireless LAN with Backward Compatibility," Proceedings of the 2010 IEICE (Institute of Electronics, Information and Communication Engineers) General Conference, Mar. 2, 2010, p. 570.

Liu Y., et al., "Protocol for SU and MU Sounding Feedback (doc. :IEEE.802.11-10/1091r0)", IEEE 802.11, Sep. 14, 2010, pp. Slide 1-Slide 7, XP002660721, Retrieved from the Internet: URL:https://mentor.ieee.org/802.11/dcn/10/11-10-1091-00-00ac-protocol-for-su-and-musounding-feedback.pptx [retrieved on Oct. 6, 2011] Slide 3.

Robert, et al., "IEEE P802.11-09/0992R15—Specification Framework for TGac", IEEE P802.11 Wireless LANS, Sep. 16, 2010, pp. 1-27, XP002662889, Retrieved from the Internet: URL: https://mentor.ieee.org/802.11/dcn/09/11-09-0992-15-00ac-proposed-specificationframework-for-tgac.doc [retrieved on Nov. 7, 2011].

Stacey R., et al., "Specification Framework for TGac," IEEE802.11-09/0992r17,Nov. 11, 2010.

Zhang H., et al., "11ac Explicit Sounding and Feedback, 802.11-10/1105r0", IEEE 802.11 TGac, Sep. 14, 2010, XP55018327, pp. 1-43, Retrieved from the Internet: URL: https://mentor.ieee.org/802.11/documentsΔis dcn=1105&is group=00ac [retrieved on Feb. 2, 2012].

\* cited by examiner

SYSTEMS AND METHODS FOR COMMUNICATION OF CHANNEL STATE INFORMATION

CROSS REFERENCE TO RELATED APPLICATION(S)

This application claims the benefit of U.S. Provisional Application No. 61/387,542, filed Sep. 29, 2010; U.S. Provisional Application No. 61/389,495, filed Oct. 4, 2010; U.S. Provisional Application No. 61/405,283, filed Oct. 21, 2010; U.S. Provisional Application No. 61/422,098, filed Dec. 10, 2010; U.S. Provisional Application No. 61/432,115, filed Jan. 12, 2011; U.S. Provisional Application No. 61/405,194, filed Oct. 20, 2010; and U.S. Provisional Application No. 61/409,645, filed Nov. 3, 2010; the entire content of each of which is incorporated herein by reference. This application further claims the benefit of U.S. Provisional Application No. 61/414,651, filed Nov. 17, 2010. This application is related to U.S. application Ser. No. 13/247,023, titled "SYSTEMS AND METHODS FOR COMMUNICATION OF CHANNEL STATE INFORMATION," filed on even date herewith, U.S. application Ser. No. 13/247,062, titled "SYSTEMS AND METHODS FOR COMMUNICATION OF CHANNEL STATE INFORMATION," filed on even date herewith, U.S. application Ser. No. 13/247,086, titled "SYSTEMS AND METHODS FOR COMMUNICATION OF CHANNEL STATE INFORMATION," filed on even date herewith, U.S. application Ser. No. 13/247,100, titled "SYSTEMS, METHODS AND APPARATUS FOR DETERMINING CONTROL FIELD AND MODULATION CODING SCHEME INFORMATION," filed on even date herewith, U.S. application Ser. No. 13/247,124, titled "SYSTEMS, METHODS AND APPARATUS FOR DETERMINING CONTROL FIELD AND MODULATION CODING SCHEME INFORMATION," filed on even date herewith, U.S. application Ser. No. 13/247,144, titled "SYSTEMS, METHODS AND APPARATUS FOR DETERMINING CONTROL FIELD AND MODULATION CODING SCHEME INFORMATION," filed on even date herewith, each of which are incorporated herein by reference, in their entirety.

BACKGROUND

1. Field

Certain aspects of the present disclosure generally relate to wireless communications and, more particularly, to methods of communicating Channel State Information (CSI).

2. Background

In order to address the issue of increasing bandwidth requirements demanded for wireless communications systems, different schemes are being developed to allow multiple user terminals to communicate with a single access point by sharing the channel resources while achieving high data throughputs. Multiple Input Multiple Output (MIMO) technology represents one such approach that has recently emerged as a popular technique for next generation communication systems. MIMO technology has been adopted in several emerging wireless communications standards such as the Institute of Electrical and Electronics Engineers (IEEE) 802.11 standard. The IEEE 802.11 denotes a set of Wireless Local Area Network (WLAN) air interface standards developed by the IEEE 802.11 committee for short-range communications (e.g., tens of meters to a few hundred meters).

A MIMO system employs multiple ($N_T$) transmit antennas and multiple ($N_R$) receive antennas for data transmission. A MIMO channel formed by the $N_T$ transmit and $N_R$ receive antennas may be decomposed into $N_s$ independent channels, which are also referred to as spatial channels, where $N_s$ min $\{N_T, N_R\}$. Each of the $N_s$ independent channels corresponds to a dimension. The MIMO system can provide improved performance (e.g., higher throughput and/or greater reliability) if the additional dimensionalities created by the multiple transmit and receive antennas are utilized.

In wireless networks with a single Access Point (AP) and multiple user stations (STAs), concurrent transmissions may occur on multiple channels toward different stations, both in the uplink and downlink direction. Many challenges are present in such systems.

SUMMARY

Certain aspects of the present disclosure provide a method of wireless communication. The method comprises receiving a request for channel state information. The method comprises determining parameters of the channel state information based on information included in the request. The method comprises determining the channel state information based at least in part on the determined parameters. The method comprises transmitting a frame comprising at least a portion of the determined channel state information.

Certain aspects of the present disclosure provide an apparatus for wireless communications. The apparatus comprises a receiver configured to receive a request for channel state information. The apparatus comprises a processing system configured to determine parameters of the channel state information based on information included in the request, and to determine the channel state information based at least in part on the determined parameters. The apparatus comprises a transmitter configured to transmit a frame comprising at least a portion of the determined channel state information.

Certain aspects of the present disclosure provide an apparatus for wireless communications. The apparatus comprises means for receiving a request for channel state information. The apparatus comprises means for determining parameters of the channel state information based on information included in the request. The apparatus comprises means for determining the channel state information based at least in part on the determined parameters. The apparatus comprises means for transmitting a frame comprising at least a portion of the determined channel state information.

Certain aspects of the present disclosure provide a computer program product for wirelessly communicating comprising a computer readable medium comprising instructions. The instructions when executed cause an apparatus to receive a request for channel state information. The instructions when executed cause an apparatus to determine parameters of the channel state information based on information included in the request. The instructions when executed cause an apparatus to determine the channel state information based at least in part on the determined parameters. The instructions when executed cause an apparatus to transmit a frame comprising at least a portion of the determined channel state information.

Certain aspects of the present disclosure provide an access terminal. The access terminal comprises at least one antenna. The access terminal comprises a receiver configured to receive, via the at least one antenna, a request for channel state information. The access terminal comprises a processing system configured to determine parameters of the channel state information based on information included in the request, and to determine the channel state information based at least in part on the determined parameters. The access terminal comprises a transmitter configured to transmit a frame comprising at least a portion of the determined channel state information.

Certain aspects of the present disclosure provide a method of wireless communication. The method comprises transmitting a request for channel state information to one or more apparatuses, wherein the request comprises a field identifying each of the one or more apparatuses and indicating parameters for each of the one or more apparatuses to be used when determining the channel state information. The method comprises receiving a frame comprising channel state information from at least one of the one or more apparatuses in response to the request, the channel state information having been determined based at least in part on the parameters indicated by the request.

Certain aspects of the present disclosure provide an apparatus for wireless communications. The apparatus comprises a transmitter configured to transmit a request for channel state information to one or more apparatuses, wherein the request comprises a field identifying each of the one or more apparatuses and indicating parameters for each of the one or more apparatuses to be used when determining the channel state information. The apparatus comprises a receiver configured to receive a frame comprising channel state information from at least one of the one or more apparatuses in response to the request, the channel state information having been determined based at least in part on the parameters indicated by the request.

Certain aspects of the present disclosure provide an apparatus for wireless communications. The apparatus comprises means for transmitting a request for channel state information to one or more apparatuses, wherein the request comprises a field identifying each of the one or more apparatuses and indicating parameters for each of the one or more apparatuses to be used when determining the channel state information. The apparatus comprises means for receiving a frame comprising channel state information from at least one of the one or more apparatuses in response to the request, the channel state information having been determined based at least in part on the parameters indicated by the request.

Certain aspects of the present disclosure provide a computer program product for wirelessly communicating comprising a computer readable medium comprising instructions. The instructions when executed cause an apparatus to transmit a request for channel state information to one or more apparatuses, wherein the request comprises a field identifying each of the one or more apparatuses and indicating parameters for each of the one or more apparatuses to be used when determining the channel state information. The instructions when executed cause an apparatus to receive a frame comprising channel state information from at least one of the one or more apparatuses in response to the request, the channel state information having been determined based at least in part on the parameters indicated by the request.

Certain aspects of the present disclosure provide an access point. The access point comprises at least one antenna. The access point comprises a transmitter configured to transmit, via the at least one antenna, a request for channel state information to one or more apparatuses, wherein the request comprises a field identifying each of the one or more apparatuses and indicating parameters for each of the one or more apparatuses to be used when determining the channel state information. The access point comprises a receiver configured to receive a frame comprising channel state information from at least one of the one or more apparatuses in response to the request, the channel state information having been determined based at least in part on the parameters indicated by the request.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
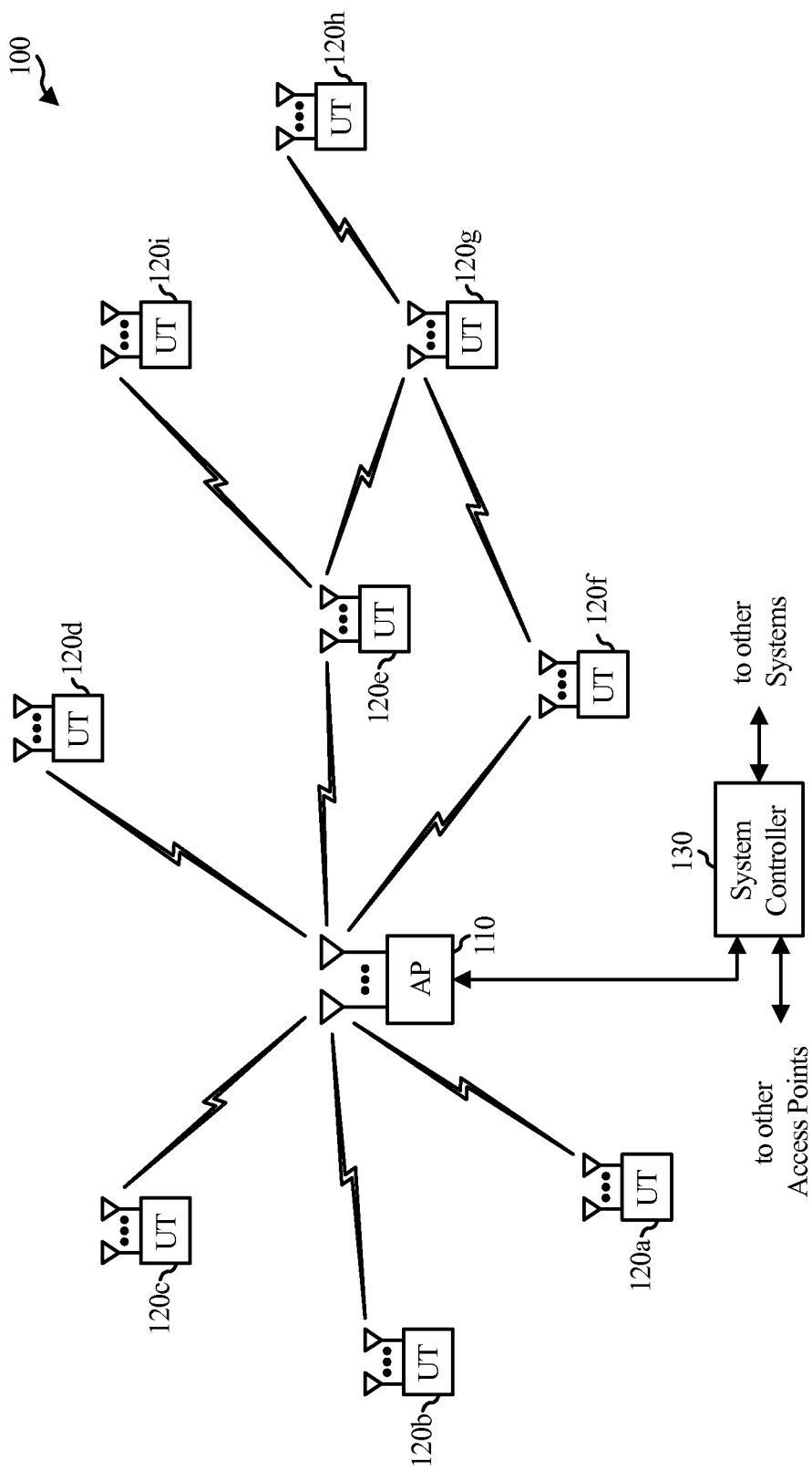
FIG. 1 illustrates a diagram of a wireless communications network in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the described aspects are mentioned, the scope of the disclosure is not intended to be limited to particular benefits, uses, or objectives.

Rather, aspects of the disclosure are intended to be broadly applicable to different wireless technologies, system configurations, networks, and transmission protocols, some of which are illustrated by way of example in the figures and in the following description of aspects. The detailed description and drawings are merely illustrative of the disclosure rather than limiting.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. A TDMA system may implement GSM or some other standards known in the art. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An OFDM system may implement IEEE 802.11 or some other standards known in the art. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. A SC-FDMA system may implement 3GPP-LTE ($3^{rd}$ Generation Partnership Project Long Term Evolution) or other standards.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or using some other terminology. A user terminal may be fixed or mobile and may also be referred to as a mobile station or a wireless device, or using some other terminology. The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, the AP 110 may be configured to communicate with both SDMA and non-SDMA user terminals. This approach may conveniently allow older versions of user terminals ("legacy" stations) that do not support SDMA to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal may transmit user-specific data to and/or receive user-specific data from the access point. In general, each selected user terminal may be equipped with one or multiple antennas (i.e., $N_{ut} \geq 1$). The K selected user terminals can have the same number of antennas, or one or more user terminals may have a different number of antennas.

The SDMA system 100 may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, where each time slot may be assigned to a different user terminal 120.

Figure 2:
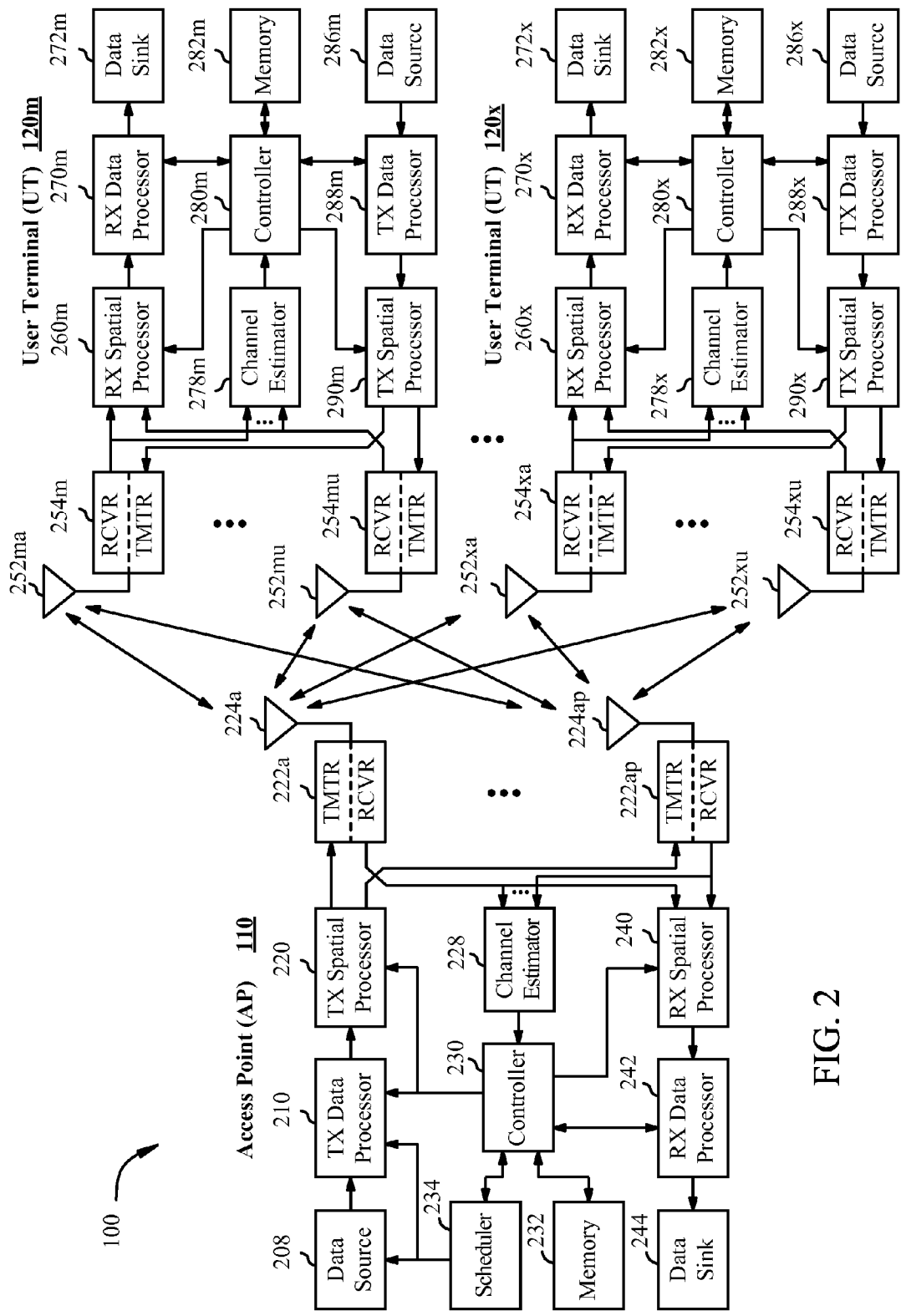
FIG. 2 illustrates a block diagram of an example access point and user terminals in accordance with certain aspects of the present disclosure.

FIG. 2 illustrates a block diagram of the access point 110 and two user terminals 120m and 120x in MIMO system 100. The access point 110 is equipped with $N_t$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. The user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. $N_{up}$ may or may not be equal to $N_{dn}$, and $N_{up}$ and $N_{dn}$ may be static values or may change for each scheduling interval. Beam-steering or some other spatial processing technique may be used at the access point 110 and/or the user terminal 120.

On the uplink, at each user terminal 120 selected for uplink transmission, a TX data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252, for example to transmit to the access point 110.

$N_{up}$ user terminals may be scheduled for simultaneous transmission on the uplink. Each of these user terminals may perform spatial processing on its respective data symbol stream and transmit its respective set of transmit symbol streams on the uplink to the access point 110.

At the access point 110, $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides $N_{up}$ recovered uplink data symbol streams. The receiver spatial processing may be performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 may provide $N_{ap}$ downlink signals for transmission from $N_{ap}$ antennas 224, for example to transmit to the user terminals 120.

At each user terminal 120, $N_{ut,m}$ antennas 252 receive the $N_{ap}$ downlink signals from the access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal 120. The receiver spatial processing may be performed in accordance with the CCMI, MMSE, or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 may also control the operation of various processing units at the access point 110 and user terminal 120, respectively.

Figure 3:
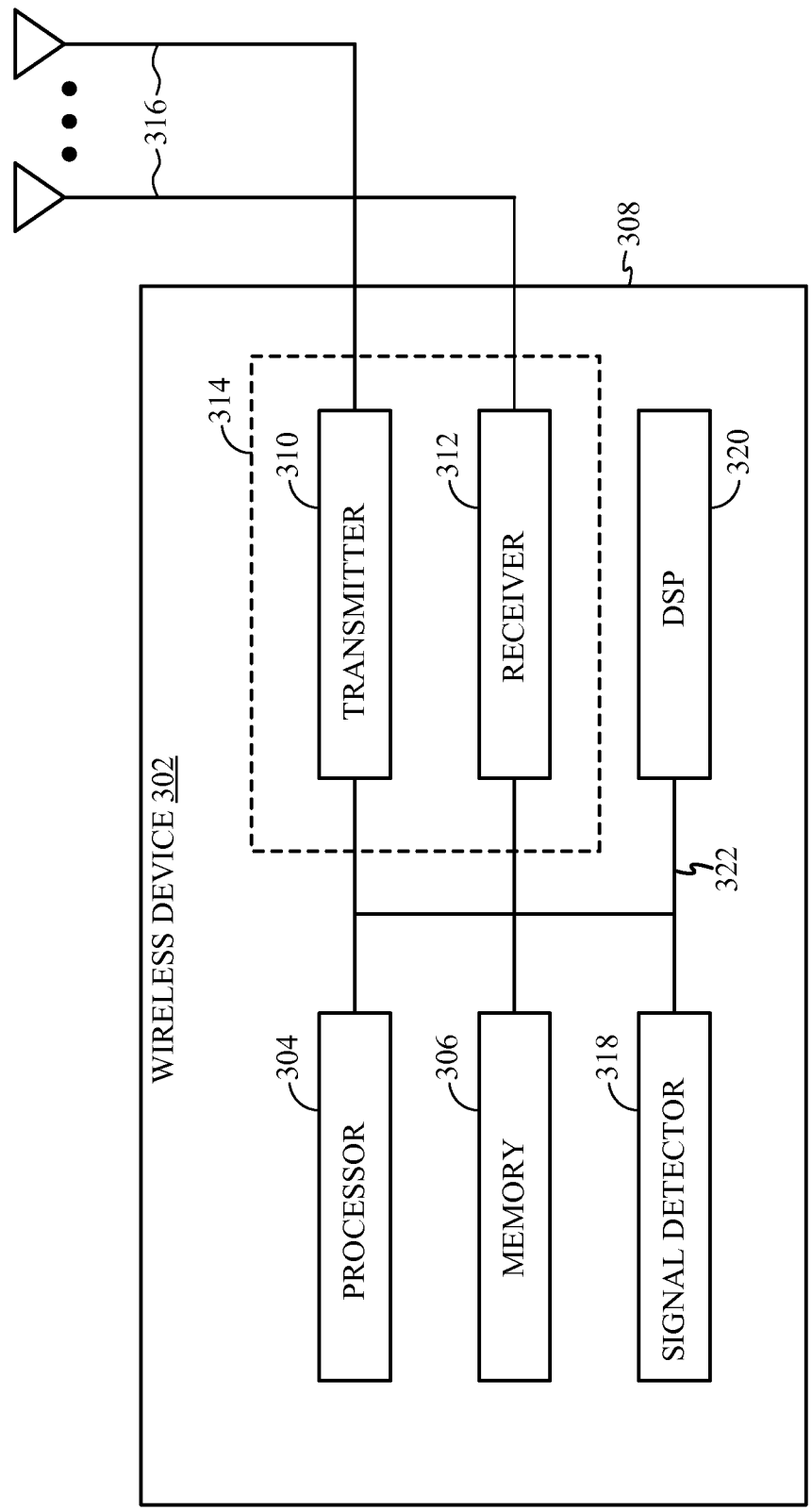
FIG. 3 illustrates a block diagram of an example wireless device in accordance with certain aspects of the present disclosure.

FIG. 3 illustrates various components that may be utilized in a wireless device 302 that may be employed within the wireless communication system 100. The wireless device 302 is an example of a device that may be configured to implement the various methods described herein. The wireless device 302 may implement an access point 110 or a user terminal 120.

The wireless device 302 may include a processor 304 which controls operation of the wireless device 302. The processor 304 may also be referred to as a central processing unit (CPU). Memory 306, which may include both read-only memory (ROM) and random access memory (RAM), provides instructions and data to the processor 304. A portion of the memory 306 may also include non-volatile random access memory (NVRAM). The processor 304 may perform logical and arithmetic operations based on program instructions stored within the memory 306. The instructions in the memory 306 may be executable to implement the methods described herein.

The processor 304 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 302 may also include a housing 308 that may include a transmitter 310 and a receiver 312 to allow transmission and reception of data between the wireless device 302 and a remote location. The transmitter 310 and receiver 312 may be combined into a transceiver 314. A single or a plurality of transmit antennas 316 may be attached to the housing 308 and electrically coupled to the transceiver 314. The wireless device 302 may also include (not shown) multiple transmitters, multiple receivers, and multiple transceivers.

The wireless device 302 may also include a signal detector 318 that may be used in an effort to detect and quantify the level of signals received by the transceiver 314. The signal detector 318 may detect such signals as total energy, energy per subcarrier per symbol, power spectral density and other signals. The wireless device 302 may also include a digital signal processor (DSP) 320 for use in processing signals.

The various components of the wireless device 302 may be coupled together by a bus system 322, which may include a power bus, a control signal bus, and a status signal bus in addition to a data bus.

In some aspects, the wireless system 100 illustrated in FIG. 1 operates in accordance with IEEE 802.11 ac wireless communications standard. The IEEE 802.11 ac represents a IEEE 802.11 amendment that allows for higher throughput in IEEE 802.11 wireless networks. The higher throughput may be realized through several measures, for example parallel transmissions to multiple stations (STAs) at once. In some aspects, a wider channel bandwidth (e.g., 80 MHz or 160 MHz) is used. The IEEE 802.11ac standard may also sometimes be referred to as Very High Throughput (VHT) wireless communications standard.

Certain aspects of the present disclosure support a low-overhead method for communicating Channel State Information (CSI) or feedback therefore. For example, such information may be communicated between the user terminals 120 and the access point 110 in the wireless system 100. Certain aspects of the present disclosure further support packet formats for a Null Data Packet Announcement (NDPA), CSI poll, and CSI feedback. Some aspects support a communication indicating whether CSI has been received and/or stored, for example by or at an AP. This information may be used by an STA, for example, to determine whether to send further CSI and/or whether to adjust parameters for transmitting the CSI. Some aspects support a communication indicating whether CSI is being transmitted, for example by an STA. This information may be used by an AP, for example, to determine how to transmit requests for requests for the CSI and/or whether to adjust parameters for transmitting the CSI requests. In some cases, the CSI feedback may be too large to be carried in a single Media Access Control (MAC) protocol data unit (MPDU) or a Physical Layer (PHY) protocol data unit (PPDU). Certain aspects of the present disclosure further support a protocol for CSI feedback segmentation. In the following description, reference is made to a user station (STA). As described above, a STA may comprise a user terminal, for example the user terminal 120 or the wireless device 302.

Channel State Information

Figure 4:
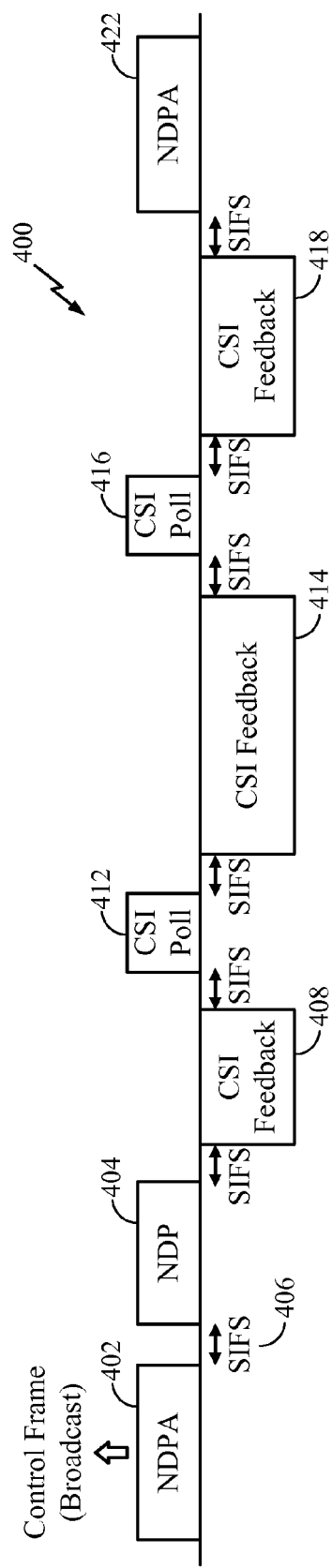
FIG. 4 illustrates an aspect of a Channel State Information (CSI) feedback protocol.

FIG. 4 illustrates an aspect of a Channel State Information (CSI) feedback protocol 400. An access point (AP) may transmit to one or more user stations (STAs) a Null Data Packet Announcement (NDPA) frame 402 followed by a Null Data Packet (NDP) frame 404 after a Short Inter-Frame Symbol (SIFS) period 406. The NDPA frame 402 may comprise Association Identifiers (AIDs) of the STAs that should transmit computed CSI feedback messages to the AP, as will be described in additional detail below.

Those STAs that are not identified in the NDPA may ignore the following NDP frame 404. The NDP frame 404 may comprise a sounding frame utilized by each of the STAs to compute corresponding CSI feedback. A first listed STA within the NDPA frame 402 may transmit CSI Feedback 408 subsequent to a SIFS period after the transmission of the NDP frame 404, as illustrated in FIG. 4. In some aspects, the CSI Feedback 408 comprises only a portion of the complete CSI feedback for the first listed STA. For example, when the complete CSI feedback is too large to be transmitted in a data unit such as an MPDU or a PPDU, the portion included in the CSI Feedback 408 may be small enough for transmission in the data unit. In these aspects, the AP may transmit a CSI Poll 412 to request an additional portion of the complete CSI feedback from the first listed STA. The first listed STA may then transmit another portion such as CSI Feedback 414 in response to the CSI Poll 412. This process of polling an STA may continue until all portions of the complete CSI feedback have been received.

In some aspects, a CSI Poll may be sent by the AP to another STA listed in the NDPA frame to request the other STA to send CSI feedback. For example, if the first listed STA in the NDPA frame 402 divides its complete CSI feedback into the two portions of CSI Feedback 408, 414, then the AP may request another STA listed in the NDPA frame 402 to begin transmission of CSI feedback with CSI Poll 416. In response, the other STA may transmit CSI Feedback 418, which may be complete CSI feedback or a portion of the complete CSI feedback for the other STA. Any number of STAs may be identified in the NDPA frame 402, as will be discussed in additional detail below, and the AP may transmit any number of CSI polls and/or receive any number of CSI feedbacks or portions thereof.

After the NDPA frame 402 is transmitted, the AP may transmit a second NDPA frame 422 to again request CSI feedback. The STAs from which CSI feedback is requested by the NDPA frame 422 may be different or the same as the STAs from which CSI feedback is requested by the NDPA frame 402. The number of STAs from which CSI feedback is requested in the NDPA frames 402, 422 may be the same or may vary.

In some aspects, the NDPA frame 422 is transmitted after CSI feedback has been received from all of the STAs identified in the NDPA frame 402. In some aspects, the NDPA frame 422 is transmitted a certain time period after the NDPA frame 402, regardless of whether CSI feedback has been received from all of the STAs identified in the NDPA frame 402. In some aspects, the NDPA frame 422 is transmitted after a polling message such as a CSI poll has been sent to all of the STAs identified in the NDPA frame 402. In some aspects, the NDPA frame 422 may identify one or more STAs that are not identified in the NDPA frame 402, or may identify a subset of the STAs that are identified in the NDPA frame 402. Thus, the AP may request CSI feedback from an STA with the NDPA frame 422 while still receiving CSI feedback from one or more STAs identified in the NDPA frame 402. In some aspects, the NDPA frame 422 may transmitted by the AP in response to a certain event, or the transmission of the NDPA frame 422 may be triggered by an action of the AP or another device.

Figure 5:
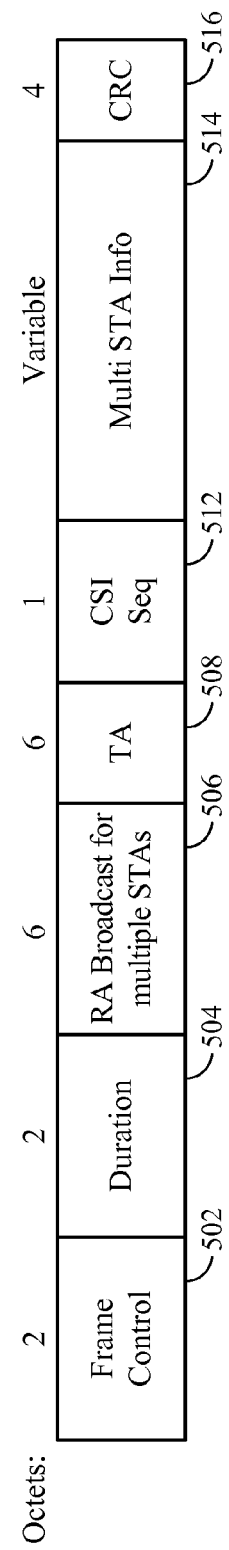
FIG. 5 illustrates an aspect of an NDPA frame.

FIG. 5 illustrates an aspect of an NDPA frame, for example the NDPA frame 422. In some aspects, the NDPA frame 422 may be referred to as a CSI request message, which may be of type control frame. The NDPA frame 422 may comprise one or more of a frame control field 502, a duration field 504, an RA broadcast field 506, a TA field 508, a CSI sequence field 512, an STA information field 514, and a CRC field 516. The NDPA frame 422 may be transmitted or broadcast by the AP, as described above. The NDPA frame 402 may be formatted or configured similar to the NDPA frame 422.

In the illustrated aspect, the frame control field 502 comprises 16 bits. Also in the illustrated aspect, the duration field 504 comprises 16 bits and may include a length of the NDPA frame 422. The CRC field 516 in the illustrated aspect comprises 32 bits and may comprise data for determining a Cyclic Redundancy Check (CRC).

In the illustrated aspect, the RA broadcast field 506 comprises 48 bits. The RA broadcast field 506 may comprise a broadcast/multicast address for multiple STAs. For example, the RA broadcast field 506 may include a group address, where a plurality of STAs belong to the group. In such aspect, each STA may identify if it is being addressed based on the group address. In other aspects, the RA broadcast field 506 may instead identify a single STA, for example by indicating a MAC address of an intended STA. In some aspects, the RA broadcast field 506 may instead comprise or be referred to as a DA (destination address) field.

In the illustrated aspect, the TA field 508 comprises 48 bits. The TA field 508 may comprise an address or identifier of a device transmitting the NDPA frame 422, for example an address of the transmitting AP. In some aspects, the TA field 508 may instead comprise or be referred to as an SA (source address) field.

In the illustrated aspect, the CSI sequence field 512 comprises 8 bits. The CSI sequence field 512 may comprise a sequence number for the NDPA frame 422 or another descriptor uniquely identifying the NDPA frame 422.

In the illustrated aspect, the length of the STA information field 514 may vary. The STA information field 514 may include information for each STA from which CSI or other such feedback information is requested.

Figure 6A:
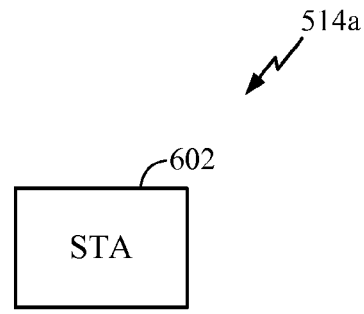
FIGS. 6A-6C illustrate aspects of an STA information field.
Figure 6B:
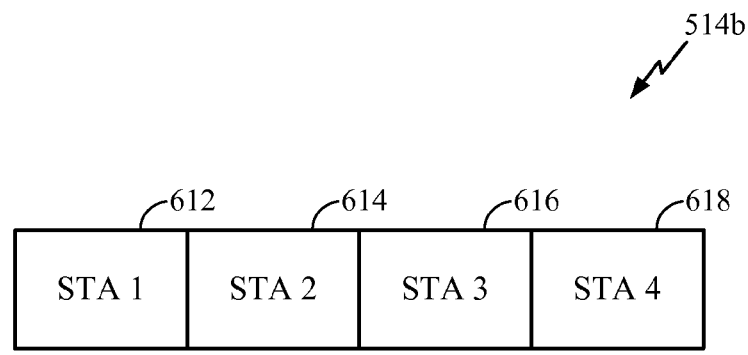
Figure 6C:
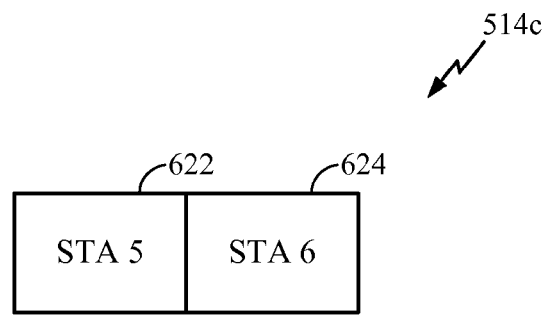

FIGS. 6A-6C illustrate aspects of an STA information field, for example the STA information field 514. In the aspect illustrated in FIG. 6A, when the RA broadcast field 506 of the NDPA frame 422 identifies a single STA, the STA information field 514*a* will include information 602 for only that identified STA. In another aspect illustrated in FIGS. 6B and 6C, where the RA broadcast field 506 of the NDPA frame 422 comprises a broadcast/multicast address for multiple STAs, for example, information for each STA from which the AP is requesting feedback will be included in the STA information field 514. In FIG. 6B, the AP is requesting CSI from STAs 1-4, and information 612-618 for each STA is included in the STA information field 514*b*. In FIG. 6C, in contrast, the AP is requesting CSI only from STAs 5 and 6, and information 622 and 624 is included in the STA information field 514*c*. In some aspects, a broadcast/multicast or group address may be included in the RA broadcast field 506, but information for only a single STA included in the STA information field 514. In this way, a broadcast/multicast address may be included in the NDPA frame 422 for ease of processing and/or uniformity, but a single STA addressed.

Figure 7A:
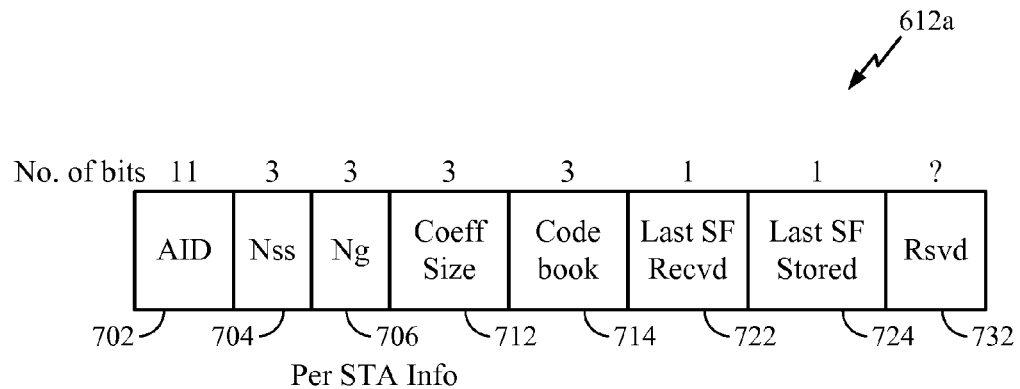
FIGS. 7A-7C illustrate aspects of STA information included in the STA information field illustrated in FIGS. 6A-6C.
Figure 7B:
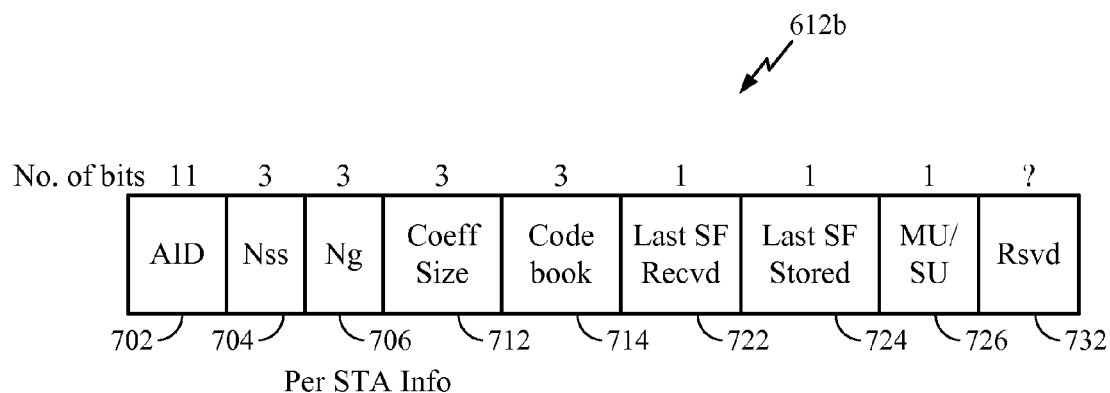
Figure 7C:
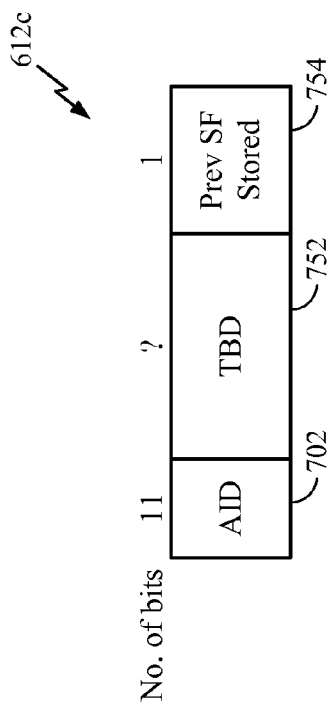

FIGS. 7A-7C illustrate aspects of STA information included in the STA information field 514. Any one of the STA information 602-624 illustrated in FIGS. 6A-6C may be formatted as illustrated in any of FIGS. 7A-7C. As an example, STA information 612 is illustrated in FIG. 7.

The STA information 612 may communicate to an STA parameters that the STA may use to report CSI. In some aspects, the CSI returned by the STA is referred to as sounding feedback (SF). In these aspects, the STA information 612 may include information or data for the STA to determine and/or calculate SF based on a sounding frame included in the NDP frame 404 illustrated in FIG. 4, for example. In some aspects, the STA information 612 may be used to determine no to send SF, or to send a form of SF that requires less data.

In the aspect illustrated in FIG. 7A, STA information 612*a* may comprise one or more of an AID field 702, an Nss field 704, an Ng field 706, a coefficient field 712, and a codebook field 714, a last SF received field 722, and a last SF stored field 724. In some aspects, the STA information 612*a* further comprises a reserved field 732 that includes bits in addition to those assigned to the fields 702-724 that may be used for any of a variety of purposes. In some aspects, the fields 702-732 are arranged in an order that differs from the order illustrated in FIG. 7A.

In the illustrated aspect, the AID field 702 comprises 11 bits and may include an AID. As described above, an AID may comprise an Association Identifier of an STA. The AID may comprise any data or descriptor that uniquely identifies the STA. For example, a physical address such as a MAC address may be included in the AID. In some aspects, each of the fields 704-724 may include information or data indicating parameters for the STA identified by the AID field 702 to use in calculating, determining, or generating CSI or SF.

In the illustrated aspect, the Nss field 704 comprises at least 3 bits. The Nss field 704 may indicate a number of spatial channels or streams (e.g., Eigen modes) of CSI feedback to be computed at the STA identified by the AID field 702.

In the illustrated aspect, the Ng field 706 comprises at least 3 bits. In some aspect, the Ng field 706 comprises at least 2 bits. The Ng field 706 may indicate a grouping of tones on which the STA identified by the AID field 702 is to generate CSI feedback. For example, the tones may correspond to sub-carriers in an OFDM system.

In the illustrated aspect, the coefficient field 712 comprises at least 3 bits. In some aspects, the coefficient field 712 comprises one or more bits. The coefficient field 712 may indicate a coefficient size, which may correspond to a quantization used by the STA identified by the AID field 702 for matrix entries of the CSI, as will be described in additional detail below. In some aspects, the coefficient field 712 is omitted. For example, the NDPA 402 may indicate that the CSI is formatted as a form of compressed feedback, in which case a coefficient size may not be included.

In the illustrated aspect, the codebook field 714 comprises at least 3 bits. In some aspects, the codebook field 714 comprises one or more bits. The codebook field 714 may indicate a quantization for angles that the STA identified by the AID field 702 should use for SF.

In the illustrated aspect, the last SF received field 722 comprises at least 1 bit. The last SF received field may indicate whether the AP has received SF from the STA identified by the AID field 702 subsequent to sending a previous NDPA frame. For example, in the aspect discussed with respect to FIG. 4, the NDPA frame 402 was transmitted to several STAs to request channel state information. A second STA identified in the NDPA frame 422 transmitted the CSI feedback 418. In the NDPA frame 422, if the AID field 702 in the STA information 612a identifies the second STA, then last SF received field 722 may indicate whether the AP received the CSI feedback 418. For example, the last SF received field may be set to a value of 0 if the CSI feedback 418 was not received, and may be set to a value of 1 if the CSI feedback 418 was received. In other aspects, these values may be reversed. In some aspects, the last SF received field 722 is used as an acknowledgement of receipt of the last sounding feedback that the AP polled for.

In some aspects, the last SF received field comprises at least 8 bits and may include a sequence number. In this aspect, the last SF received field indicates the sequence number corresponding to the last CSI feedback transmitted. For example, the NDPA frame 422 illustrated in FIG. 5 includes a sequence number for the NDPA frame 422 or another descriptor uniquely identifying the NDPA frame 422 in the CSI sequence field 512. If SF is received in response to the NDPA frame 422 from an STA—in some aspects, the SF includes the sequence number or other identifier—a following NDPA frame may include the sequence number or other identifier in a last SF received filed of an STA information identifying the STA from which the SF was received.

Channel state information transmitted by an STA may not have been received by an AP for any of a variety of reasons. For example, data conflicts, channel interference, or physical obstacles may all prevent a communication such as CSI feedback from being received, or reduce the likelihood that the CSI feedback is accurately received. In some aspects, even in situations where the AP receives CSI from an STA, the last SF field will be set to indicate that the CSI feedback was not received if the CSI feedback cannot be accurately decoded or processed.

The last SF received field 722 may be used by the STA identified by the AID field 702 for any number of purposes. For example, if the STA transmitted SF in response to the NDPA frame 402, but the last SF received field 722 indicates that the SF was not received by the AP, the STA may determine that there was an error in the transmission. In response, the STA may retransmit the previous SF. As another example, if the STA did not transmit SF in response to the NDPA frame 402, but the last SF received field 722 indicates that SF was received, the STA may determine that the received SF is erroneous and may send a communication to the AP instructing the AP to discard the received SF.

In some aspects, the last SF received field 722 may be used to adjust a rate used to send SF. For example, when the last SF received field 722 indicates that SF was not received even though the STA transmitted the SF, the STA may reduce a PHY rate for sending a subsequent SF. Similarly, when the last SF received field 722 indicates that a previously transmitted SF was successfully received, the STA may increase a PHY rate for sending a subsequent SF. In this way, a rate used to send the SF may be continually adjusted or tuned for increased performance. In some aspects, another parameter or characteristic besides the rate may be adjusted based on whether a previous SF was properly received. For example, a modulation used for sending the SF may be changed if the previous SF was not properly received.

In some aspects, the STA adjusts a rate only after a series of SFs was properly received, or after the series of SFs was improperly received. For example, the STA may increase a rate after receiving a certain number of NDPA frames having a last SF received field that indicates that SF was properly received. In some aspects, if a series of SFs was not properly received, for example as indicated by CSI last received fields in a series of NDPA frames, the STA may transmit a communication to the AP to indicate that the AP should refrain from sending any additional requests for CSI. In this way, network resources consumed by transmitting the NDPA to the STA may be conserved when the AP does not appear to be properly receiving any CSI from the STA.

In some aspects, the rate used by the STA to send the sounding feedback is determined from a rate of a polling message. For example, the rate used to send the CSI poll 416 in the aspect illustrated in FIG. 4 may be used to send the CSI feedback 418. As another example, the rate used to the send the CSI poll 416 may be adjusted up or down based on whether a previous SF was received, as indicated by the last SF received field, for example.

Returning to the description of the STA information 612a illustrated in FIG. 7A, the last SF stored field 724 comprises at least 1 bit. The last SF stored field 724 may indicate whether the AP has stored the last SF received from the STA identified by the AID field 702. Thus, in some aspects, the last SF stored field 724 may indicate whether the AP has stored SF received from the STA subsequent to sending a previous NDPA frame. For example, in the aspect discussed with respect to FIG. 4, the NDPA frame 402 was transmitted to several STAs to request channel state information. A second STA identified in the NDPA frame 422 transmitted the CSI feedback 418. In the NDPA frame 422, if the AID field 702 in the STA information 612a identifies the second STA, then last SF stored field 724 may indicate whether the AP stored the CSI feedback 418. For example, the last SF stored field may be set to a value of 0 if the CSI feedback 418 was not stored, and may be set to a value of 1 if the CSI feedback 418 was stored. In other aspects, these values may be reversed.

In some aspects, the last SF stored field comprises at least 8 bits and may include a sequence number. In this aspect, the last SF stored field indicates the sequence number corresponding to the last CSI feedback transmitted. For example, the NDPA frame 422 illustrated in FIG. 5 includes a sequence number for the NDPA frame 422 or another descriptor uniquely identifying the NDPA frame 422 in the CSI sequence field 512. If SF received from an STA has been stored subsequent to the NDPA frame 422—in some aspects, the SF includes the sequence number or other identifier—a following NDPA frame may include the sequence number or other identifier in a last SF stored filed of an STA information identifying the STA from which the SF was received.

Channel state information transmitted by an STA may not have been stored by an AP for any of a variety of reasons. For example, when the CSI hasn't been received or is received improperly, the CSI can't be stored by the AP. In some aspects, however, even properly received CSI may not be stored. For example, an AP may not have enough memory to store the CSI. As another example, the AP may determine not to store the CSI when a specific time period has elapsed since requesting the CSI, or when a given time period has elapsed since the CSI was determined by the STA. In this way, the CSI may have "timed out" and may not be stored. In some aspects, the AP may delete stored CSI that has "timed out." When transmitting the next NDPA, the AP may indicate in the last SF stored field for the STA that transmitted the deleted CSI that the CSI has not been stored.

The last SF stored field 724 may be used by the STA identified by the AID field 702 for any number of purposes. For example, if the STA transmitted SF in response to the NDPA frame 402, but the last SF stored field 724 indicates that the SF was not stored by the AP, the STA may retransmit the previous SF.

As another example, if the last SF stored field 724 indicates that the previous SF was stored and the STA determines that the channel for which CSI is requested has changed less than a threshold amount, or determines that the CSI has changed less than a threshold amount, the STA may determine that the stored CSI and a current CSI are substantially the same and may not to send any CSI in response to the NDPA frame 422. In this circumstance, the STA may instead send a communication to the AP indicating that no CSI will be transmitted, for example as described below. Omitting the CSI may conserve network resources and increase the speed and/or reliability of communications within the network.

In some aspects where the last SF stored field 724 indicates that the previous SF was stored, the STA may transmit information representing a difference between the stored SF and current SF. In some aspects, complete CSI feedback may comprise a matrix or data indicative thereof. In some aspects, the matrix comprises a plurality of Eigen modes, singular vectors, or singular values. As described above, the STA may determine a spatial filter matrix based on a downlink channel response matrix $H_{dn,m}$ for that STA. Feedback information (e.g., the downlink eigenvectors, eigenvalues, SNR estimates, and so on) may be thereby be transmitted, for example to the AP. Thus, channel state information and/or SF may be represented as a matrix. In some aspects, a difference between a previous SF and a current SF may also be represented by a matrix. The difference matrix, however, may require fewer bytes to represent. Thus, sending a difference CSI instead of a complete CSI may also conserve network resources.

In some aspects, when the last SF received field 722 indicates that the last SF that the AP polled has not been received, the last SF stored field 724 will always indicate that the AP has not stored the last SF polled for. For example, when the last SF received field 722 and the last SF stored field 724 are implemented as bits as described above, the last SF stored field 724 will always have a value of 0 when the last SF received field 722 has a value of 0. In other aspects, when the SF received field 722 indicates that the last SF that the AP polled has not been received, the last SF stored field 724 may be used to indicate that a previously stored SF is still being stored by the AP. For example, when the last SF received field 722 and the last SF stored field 724 are implemented as bits as described above and the last SF received field 722 has a value of 0, the last SF stored field 724 may be set to 1 to indicate that a previously stored SF is still being stored and may be switched to 0 to indicate that a previously stored SF has been deleted or that a new complete SF is requested.

Some aspects use indicators other than the fields 704-724 to indicate parameters to an STA that the STA may use to report CSI. In one aspect, a bit or series of bits in the STA information 612a may be used by the STA to lookup the relevant parameters. The STA may have parameters stored or may retrieve parameters corresponding to one or more of the Nss field 704, Ng field 706, coefficient field 712, and codebook field 714 based on such bits in the STA information 612a.

FIG. 7B illustrates another aspect 612b of the STA information 612. The STA information 612b is illustrated as including the fields 702-724 and 732 included in the STA information 612a, as well as an MU/SU field 726. In the illustrated aspect, the MU/SU field 726 comprises at least 1 bit. This field may indicates whether the STA identified by the AID field 702 is requested to provide single user (SU) or multi-user (MU) feedback. In this way, the AP may separately notify each STA identified in the NDPA frame 422 whether SU or MU feedback is requested from that respective STA.

In some aspects, one or more of the fields 702-732 are omitted from the STA information 612. Further, additional fields may be included in the STA information 612. In some aspects, some of the bits in the STA information 612 are reserved for other or future uses. For example, STA information 612c illustrated in FIG. 7C shows an aspect including the AID field 702, a field 752 having one or more bits that have been reserved for future use, and a previous SF stored field 754. The previous SF stored field may indicate when the AP has stored the last SF it had polled from the STA identified in the AID field 702. In some aspects, the previous SF stored field 754 may be configured similar to and/or used similar to the last SF stored field 724.

Figure 8:
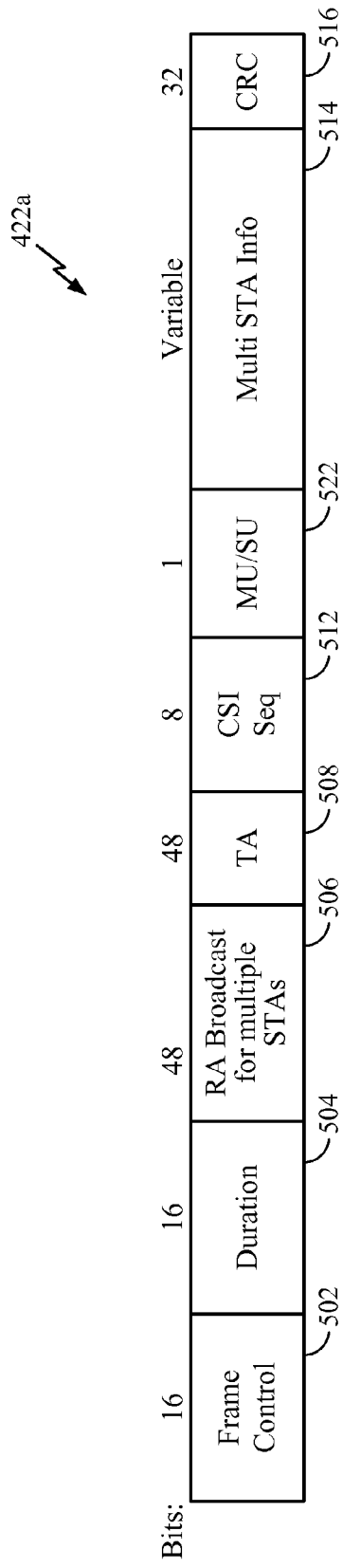
FIG. 8 illustrates an aspect of an NDPA frame.

In comparison to the aspect illustrated in FIG. 7B, another aspect for notifying STAs whether MU or SU feedback is requested is illustrated in FIG. 8. In the aspect illustrated in FIG. 8, an MU/SU field 522 is included in an NDPA frame 422a. The NDPA frame 422a may be formatted or configured similar to the NDPA frame 422, with the exception that the MU/SU field 522 is added to the NDPA frame 422a such that the MU/SU field 522 is separate from the STA information field 514. The MU/SU field 522 may be used as a "global" indicator to signify whether SU or MU feedback is requested from all of the STAs identified in the STA information field 514.

Figure 9A:
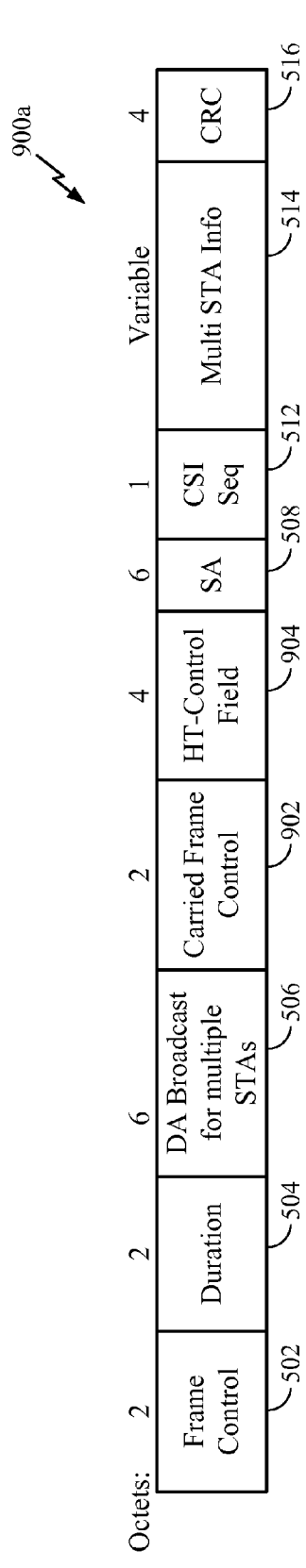
FIGS. 9A and 9B illustrate aspects of a control wrapper.
Figure 9B:
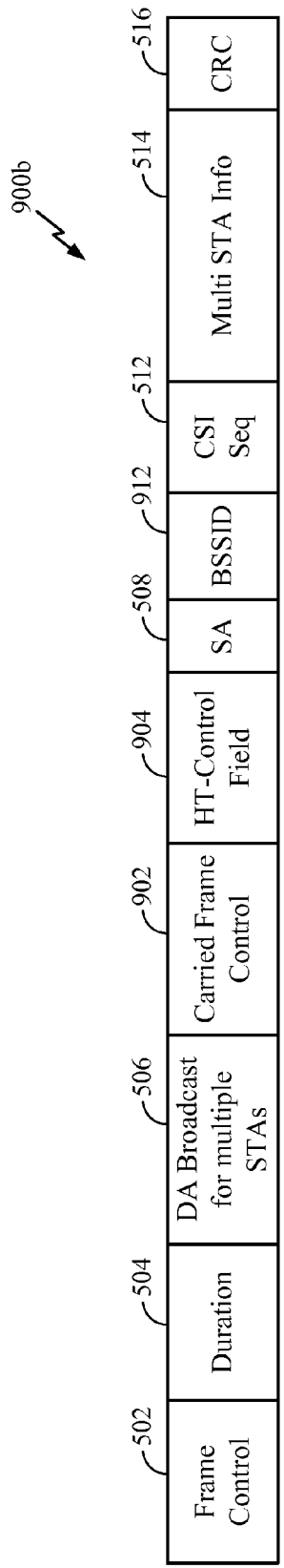

In some aspects, the AP may require or request that the CSI be transmitted using a particular modulation coding scheme (MCS). FIGS. 9A and 9B illustrate aspects of a frame including information for determining the MCS. In the aspect illustrated in FIG. 9A, frame 900a comprises an NDPA frame that has been "wrapped" in a control wrapper. Thus, the frame900a may be used to request CSI from an STA, for example in addition to or in place of the NDPA frame 422.

In the illustrated aspect, the frame900a includes the frame control field 502, duration field 504, RA broadcast field 506, SA field 508, CSI sequence field 512, STA information field 514, and CRC field 516 that are included in the NDPA 422. In addition, the frame900a includes a carried frame control field 902 and an HT-control field 904. In the illustrated aspect, the carried frame control field 902 comprises at least 2 bits, and the HT-control field 904 comprises at least 4 bits.

The HT-control field 904 may comprise information indicating an MCS for the STAs identified in the STA information field 514 to use when transmitting SF. In some aspects, the HT-control field 604 comprises a link adaption control field including information which the STAs may use to determine the MCS. In some aspects, the link adaption control field includes a TRQ (Training Request) field, an MAI (MCS Request or Antenna Selection Indication) field, an MFSI (MCS Feedback (MFB) Sequence Identifier), and an MFB/ASELC (MCS Feedback and Antenna Selection Command/Data) field. In some aspects, the frame900a includes a very high throughput (VHT) control field instead of the high throughput (HT) control field 904. The VHT control field may include information as discussed above with respect to the HT control field 904. In some aspects, the HT-control field 904 or another portion of the frame900a includes information for an STA to determine a rate to transmit CSI.

In the aspect illustrated in FIG. 9B, frame 900b is illustrated as comprising the fields 502-516, 902, and 904 illustrated with respect to the frame 900a, as well as an additional field. The additional field may comprise a service set identifier that identifies a network, for example a WLAN. In the illustrated aspect, for example, BSSID field 912 comprises a basic service set (BSS) identifier and identifies a BSS. In some aspects, the BSSID field 912 may be set to a MAC address of an AP which transmitted the frame 900b.

The fields 502-516, 902, and 904 illustrated in FIG. 9B may be configured as described above with respect to FIG. 9A. In some aspects, one or more of these fields comprise additional or fewer bits than previously described. In some aspects, the BSSID field 912 comprises anywhere from 1-32 octets. In one aspect, the BSSID field 912 comprises 6 octets. In some aspects, the fields 502-516 and 902-912 are arranged in an order that differs from the order illustrated in FIG. 9A and/or FIG. 9B.

Figure 10:
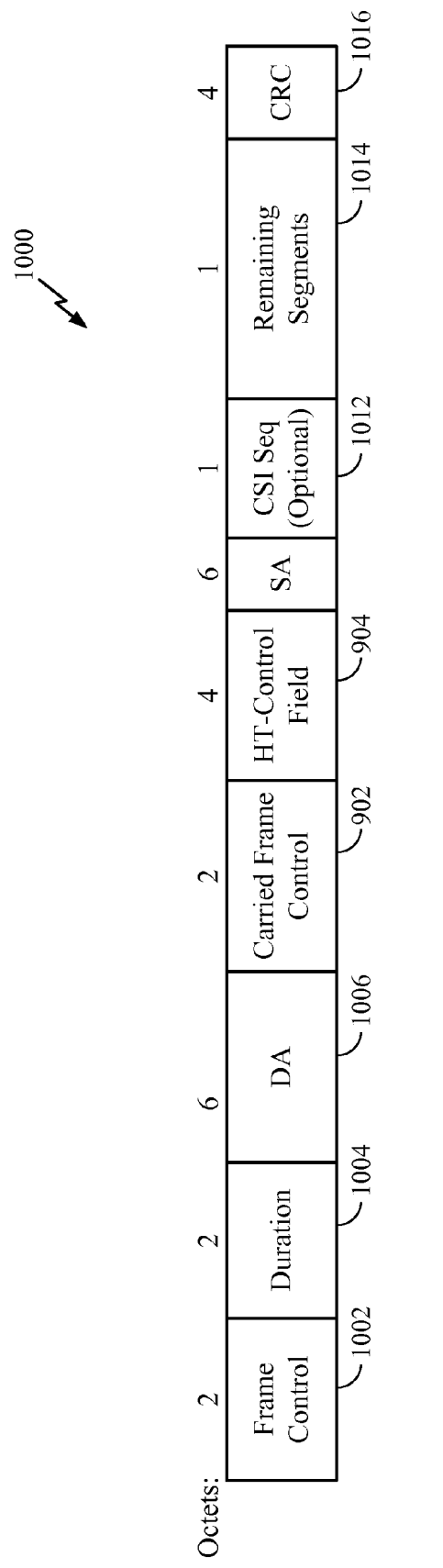
FIG. 10 illustrates an aspect of a control wrapper.

FIG. 10 illustrates another aspect of a frame 1000 including information for determining MCS. In the aspect illustrated in FIG. 10, the frame 1000 comprises a CSI poll that has been "wrapped" in a control wrapper. Thus, the frame 1000 may be used to request at least a portion of CSI from an STA, for example in addition to or in place of the CSI poll 412.

In the illustrated aspect, the frame 1000 may comprise at least one of: a frame control field 1002, a duration field 1004, a destination address (DA) field 1006, a source address (SA) field 1008, a sequence field 1012, a remaining segments field 1014, and a Cyclic Redundancy Check (CRC) field 1016.

In the illustrated aspect, the frame control field 1002 comprises 16 bits. Also in the illustrated aspect, the duration field 1004 comprises 16 bits and may include a length of the frame 1000. The CRC field 1016 in the illustrated aspect comprises 32 bits.

In the illustrated aspect, the DA field 1006 comprises 48 bits. The DA field 1006 may indicate an address of the STA that the frame 1000 is being transmitted to, for example as discussed above.

In the illustrated aspect, the SA field 1008 comprises 48 bits. The SA field 1008 may indicate an address of the AP that is transmitting the frame 1000, for example as discussed above.

In the illustrated aspect, the sequence field 1012 comprises 8 bits. The sequence field 1012 may comprise information indicative of the sequence number common to the CSI feedback for which the AP is requesting an additional segment. In some aspects, the sequence number indicated by the sequence field 1012 is the same as or is copied from the sequence number for the immediately preceding NDPA frame. Thus, when the frame 1000 is used in place of the CSI poll 412 in FIG. 4, the sequence field 1012 may have the same value as a CSI sequence field in the NDPA 402, for example.

In the illustrated aspect, the remaining segments field 1014 comprises 8 bits. The remaining segments field 1014 indicates the number of segments of CSI feedback that the AP expects to receive from the STA addressed by the DA field 1006. In some aspects, information included with CSI feedback sent by the STA includes a number of remaining segments left to be transmitted, as will be discussed below. In these aspects, information in the remaining segments field 1014 may be copied from the remaining segments field of the immediately preceding CSI information. For example, when the AP receives the portion of CSI feedback 408 in FIG. 4, the frame 1000 may be sent to the STA that transmitted the portion of CSI feedback 408 with the remaining segments field 1014 having a value of 1. In response, the STA may transmit the one remaining portion of CSI feedback 414.

The frame 1000 may further comprise the carried frame control field 902 and the HT-control field 904 described above with respect to FIG. 9A. As discussed above, the HT-control field 904 may comprise information indicating an MCS or a rate such as a physical layer rate. The STA identified in the DA field 1006 may use the information in the HT-control field 904 to determine the MCS or rate.

Figure 11:
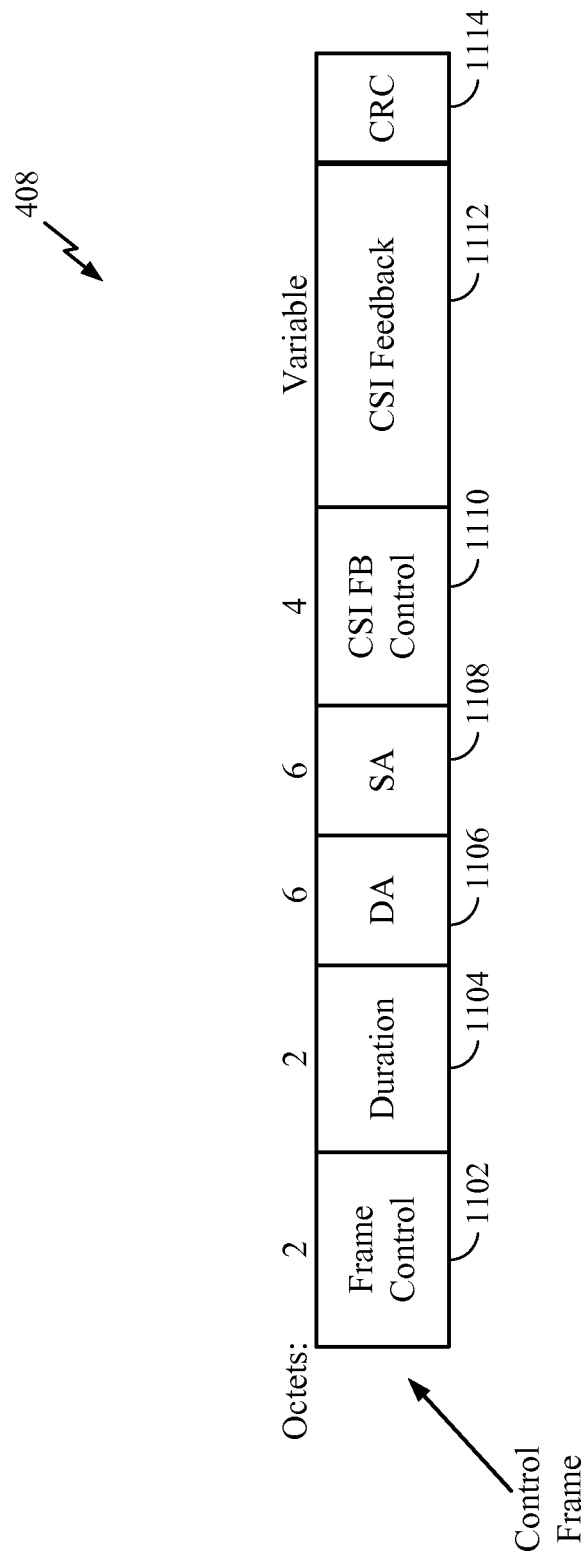
FIG. 11 illustrates an aspect of a CSI report message for communicating CSI feedback.

FIG. 11 illustrates an aspect of a CSI report message for communicating CSI feedback. For example, the CSI report message may be used to implement the CSI feedback 408 illustrated in FIG. 4. The CSI feedback 408 may be determined by a STA in response to a received NDPA frame, for example the NDPA frame 402 or the NDPA frame 422 described above. As described in additional detail below, the elements of the CSI feedback 408 may be generated based on information in the NDPA frame. The CSI report message may comprise a frame for communicating the CSI feedback.

In one aspect, the CSI feedback 408 may be generated by one of the STAs identified in the NDPA frame 402 and autonomously transmitted a SIFS period after the NDP frame 404. For example, the first STA identified in an STA information field may generate the CSI feedback 408 and autonomously transmit the CSI feedback 408 to the AP a SIFS period after receiving the NDP frame 404. Other STAs identified in the STA information field may await a polling message before transmitting respective CSI feedback, as discussed above.

The CSI feedback 408 may comprise at least one of: a frame control field 1102, a duration field 1104, a destination address (DA) field 1106, a source address (SA) field 1108, a CSI feedback control field 1110, a CSI feedback field 1112 with a computed CSI, or a Cyclic Redundancy Check (CRC) field 1114. The CSI feedback 408 may be of type Action No Acknowledgement (ACK) message that may not require an ACK response. In the illustrated aspect, the CSI feedback 408 may comprise a control frame.

In some aspects, instead of the field described above, the CSI feedback 408 may instead comprise a category field, an action field, a sounding sequence field, the CSI feedback control field 1110, and/or a sounding report. In such aspects, the CSI feedback 408 may comprise an action frame. In some aspects, the CSI feedback field 1112 and the sounding report contain similar information.

In some aspects, channel state information and/or SF may be represented as a matrix, as discussed above, and the sounding report and/or the CSI feedback field 1112 may comprise the matrix or data indicative thereof. As also discussed above, the matrix comprises a plurality of Eigen modes, singular vectors, or singular values in some aspects.

There are certain situations in which the STA may determine not to send feedback. For example, SF may not be transmitted if a prior corresponding NDPA/NDP frame was not received, or if the current SF is substantially similar to a previously transmitted SF. As another example, SF may not be transmitted if the transmission would exceed a PPDU or transmit opportunity (TXOP) limitation. In some aspects, the CSI feedback field 1112 is omitted in such situations. Thus, the absence of the CSI feedback field 1112 may indicate that no SF is being transmitted in some aspects. For example, if a device such as an AP receives the CSI feedback 408, the device may determine a length of the CSI feedback 408. The length may be used to determine whether the CSI feedback field 1112 is included, and it may be determined that no SF will be transmitted if the CSI feedback is omitted. In some aspects, an indicator in the CSI feedback control field 1110 may signify a reason why the SF is not being transmitted.

FIGS. 12A-12E illustrate an aspect of a control field for sounding feedback, for example the CSI feedback control field 1110. In some aspects, the CSI feedback control field 1110 comprises a very high throughput (VHT) MIMO control field.

Figure 12A:
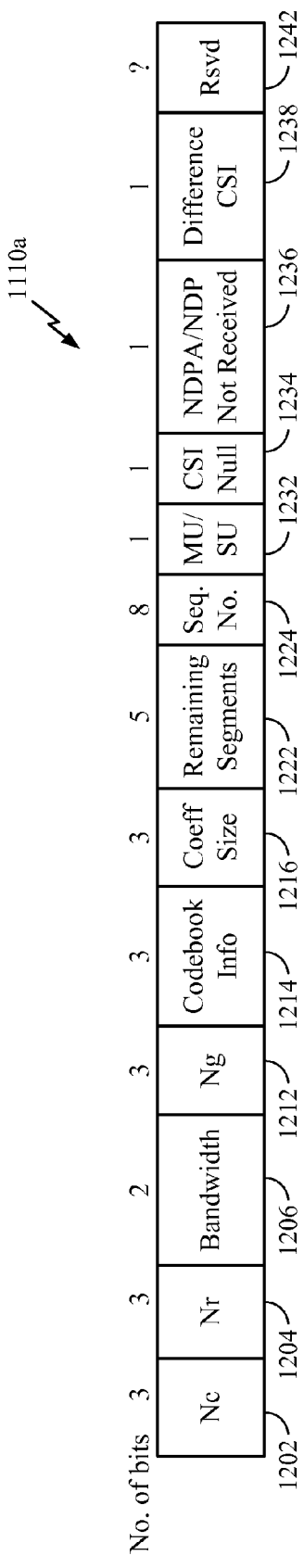
FIGS. 12A-12E illustrate aspects of a control field for sounding feedback.

In an aspect illustrated in FIG. 12A, CSI feedback control field 1110a may comprise one or more of an Nc sub-field 1202, an Nr sub-field 1204, a bandwidth sub-field 1206, an Ng sub-field 1212, a codebook sub-field 1214, a coefficient sub-field 1216, a remaining segments sub-field 1222, a sequence sub-field 1224, an MU/SU sub-field 1232, a CSI null sub-field 1234, an NDPA/NDP not received sub-field 1236, and a difference CSI sub-field 1238. In some aspects, the CSI feedback control field 1110a further comprises a reserved sub-field 1242 that includes bits in addition to those assigned to the sub-fields 1202-1238 that may be used for any of a variety of purposes. In some aspects, the sub-fields 1202-1242 are arranged in an order that differs from the order illustrated in FIG. 12.

In the illustrated aspect, the Nc sub-field 1202 comprises at least 3 bits. The Nc sub-field 1202 may indicate a number of columns in the matrix discussed above, which represents the CSI for the STA. Using 3 bits provides for information regarding at least 5 antennas. In some aspects, the 3 bits provide information for 8 antennas.

In the illustrated aspect, the Nr sub-field 1204 comprises at least 3 bits. The Nr sub-field 1204 may indicate a number of rows in the matrix discussed above. Using 3 bits provides for information regarding at least 5 antennas. In some aspects, the 3 bits provide information for 8 antennas.

In some aspects, information from the Nss sub-field 704 in the STA information 612 is used to determine Nc and Nr. In one aspect, the STA sends SF, for example in the sounding report or the CSI feedback field 1112, using exactly the same number of spatial streams (e.g. Eigen modes) as indicated by the Nss field 704. This may be reflected in Nc and Nr. Using exactly the same number of spatial streams may reduce SF overhead because the SF size will be no larger than the AP has determined is required. In this way, resources will not be wasted by sending more feedback than requested by the AP. In other aspects, a greater or fewer number of spatial streams may be used by the STA than are requested by the AP.

In the aspect illustrated in FIG. 12A, the bandwidth sub-field 1206 comprises at least 2 bits. The bandwidth sub-field 1206 may indicate a bandwidth of the CSI feedback. For example, the 2 bits may be used to represent four different values (i.e. 0, 1, 2, and 3), each of which may correspond to one of the following frequencies: 20 MHz, 40 MHz, 80 MHz, and 160 MHz.

In the aspect illustrated in FIG. 12A, the Ng sub-field 1212 comprises at least 3 bits. The Ng sub-field 1212 may indicate a grouping of tones on which the STA has generated CSI feedback. Using these three bits, 8 different tone group options may be identified. For example, options including band edge/DC tones may be identified. In some aspects, the Ng sub-field 1212 comprises at least 2 bits.

In some aspects, CSI feedback is generated for each tone being used by the STA. As an example, there may be up to 468 tones when a bandwidth of the CSI feedback is 160 MHz. Some of the tones, however, may be grouped together such that information is reported on all of the tones in the group concurrently. The Ng sub-field 1212 may indicate how the tones have been grouped and how many tones are in the group. For example, 3-4 tones may be grouped together and the information for these tones averaged to generate the CSI feedback.

In one aspect, the STA sends CSI feedback with tone groups that are no larger than the tone groups indicated by the Ng field 706 in the STA information 612. In some aspects, however, the STA may use a smaller value of Ng than indicated by the Ng field 706. Using groups that are no larger than indicated by the Ng field 706 will decrease the likelihood of MU gains being diminished. This decrease may be due to the AP having decided the Ng indicated in the Ng field 706 based on an MU/SU transmission to be used. In other aspects, the STA may use tone groups that are larger than the tone groups indicated by the Ng field 706.

In the aspect illustrated in FIG. 12A, the codebook sub-field 1214 comprises at least 3 bits. The codebook sub-field 1214 may include information that the AP may use to index into a table indicating how CSI values are quantized. In some aspects, the STA quantizes the values using at least as many bits as indicated by the codebook field 714 of the STA information 612. Using at least as many bits as indicated by the codebook field 714 will decrease the likelihood of MU gains being diminished. This decrease may be due to the AP having decided a requested quantization based on whether the AP intends to use the SF in an MU or SU protocol. In other aspects, the STA may use fewer bits than indicated by the codebook field 714. In some aspects, the codebook sub-field 1214 comprises one or more bits.

In the illustrated aspect, the coefficient sub-field 1216 comprises at least 3 bits. The coefficient sub-field 914 1216 may indicate a coefficient size, which may correspond to a quantization used by the STA for entries in the matrix described above. In some aspects, the coefficient sub-field 1216 comprises one or more bits. In some aspects, the coefficient sub-field 1216 is omitted. For example, the SF may be formatted as a compressed feedback, in which case a coefficient size may not be included.

In some aspects, the STA quantizes entries of the matrix using at least as many bits as indicated by the coefficient field 712 of the STA information 612. Using at least as many bits as indicated by the coefficient field 712 will decrease the likelihood of MU gains being diminished. This decrease may be due to the AP having decided a requested quantization based on whether the AP intends to use the SF for MU or SU. In other aspects, the STA may use fewer bits than indicated by the coefficient field 712.

In the illustrated aspect, the remaining segments sub-field 1222 may comprise at least 5 bits. The remaining segments sub-field 1222 may indicate a number of segments that are yet to be transmitted regarding the CSI feedback for the STA, as discussed above.

For example, a number of bytes for CSI feedback may be large. For example, in the case of 8×3 80 MHz uncompressed bandwidth, the number of bytes for the CSI feedback may be approximately equal to 12K. A large CSI feedback may not be able to fit into one MAC Protocol Data Unit (MPDU) due to MPDU size limitations. A maximum size of MPDU of approximately 8K may be obtained from Aggregated MPDU (A-MPDU) delimiter indication. Furthermore, an MPDU size capability may be even less since it is negotiated.

The CSI feedback may be segmented into multiple MPDUs. For example, segments of the CSI feedback may be transmitted within multiple MPDUs of an A-MPDU. Thus, the remaining segments sub-field 1222 may indicate a number of remaining segments of the CSI feedback or SF that remains to be transmitted after the current MPDU.

In the aspect illustrated in FIG. 12A, the sequence sub-field 1224 may comprise at most 8 bits. The sequence sub-field 924 may comprise information indicative of a sequence number that is common among all segments of a CSI feedback transmitted by the STA. In some aspects, the sequence number indicated by the sequence field 1224 is the same as or is copied from the sequence number from a preceding NDPA frame, for example from a CSI sequence field.

In the illustrated aspect, the CSI feedback control field 1110a includes the MU/SU sub-field 1232 to indicate if the associated CSI feedback was computed for MU or SU. In some aspects, the CSI feedback is determined pursuant to the MU/SU field in an NDPA frame, for example as illustrated in FIG. 7B or 8. In other aspects, the STA determines whether to compute the CSI for SU or MU. In some aspects, feedback calculated for SU may be determined with less resolution. Thus, determining SU feedback instead of MU feedback may reduce processing complexity at the STA or may reduce the amount of network resources used to send the feedback. In the illustrated aspect, the MU/SU field comprises at least 1 bit.

In the illustrated aspect, the CSI null sub-field 1234 comprises at least 1 bit. The CSI null sub-field 1234 may be used to indicate whether CSI will be transmitted by the STA. For example, the CSI null sub-field 1234 may be set to a value of 0 if no CSI will be transmitted, and may be set to a value of 1 if CSI will be transmitted. In other aspects, these values may be reversed. In some aspects, the CSI null sub-field 1234 may be omitted, and the length of the CSI feedback 408 is used to determine whether CSI is being transmitted. In such aspects, if it is determined that the CSI is not being transmitted, the CSI feedback control field 1110a may include an indicator that signifies whether the CSI is not being transmitted because a transmission limitation would be exceeded. For example, the CSI feedback control field 1110a may comprise a one bit field indicating whether transmission of the CSI would exceed a PPDU or TXOP limitation. Exceeding the PPDU or TXOP limitation may occur if a frame containing the CSI would be too long to transmit, for example.

In the illustrated aspect, the NDPA/NDP not received sub-field 1236 comprises at least 1 bit. When the CSI null sub-field 1234 indicates that CSI will not be transmitted, the NDPA/NDP not received sub-field 1236 may be used to indicate a condition that caused the CSI not to be transmitted. In one aspect, a value of 0 in the NDPA/NDP not received sub-field 1236 indicates that a corresponding NDPA frame was not received, while a value of 1 in the NDPA/NDP not received sub-field 1236 indicates that a corresponding NDP frame was not received.

In another aspect, a single value of the NDPA/NDP not received sub-field 1236 is used to indicate that either an NDPA or an NDP corresponding to an identifier in the sequence field 1224 was not received. For example, a value of 0 may be used to indicate this condition. The other value, which in this example is 1, may be used to indicate that no CSI is being transmitted because the current CSI is within a threshold of a previously transmitted CSI. For example, when a last SF stored field of the NDPA indicates that the last SF transmitted by the STA has been stored, the STA may refrain from sending the current SF if the current SF is substantially similar to the stored SF. In this situation, the NDPA/NDP not received sub-field 1236 may be set to a value to indicate that the channel has not changed enough to warrant the transmission of additional SF.

In the illustrated aspect, the difference CSI sub-field 1238 comprises at least 1 bit. When the CSI null sub-field 1234 indicates that CSI is being transmitted, the difference CSI sub-field may be used to indicate whether complete CSI is being transmitted or whether information representative of a difference is being transmitted. For example, a value of 0 in the difference CSI sub-field 1238 may indicate that complete CSI information is being transmitted. A value of 1 in the difference CSI sub-field 1238, however, may indicate that information representative of a difference between a previously transmitted CSI and the current CSI is being transmitted. For example, when a last SF stored field of the an NDPA indicates that the last SF of the STA has been stored at an AP, the STA may calculate and transmit a difference between the current SF and the stored SF, and indicate these actions to the AP using the difference CSI sub-field 1238. As discussed above, the difference may in some aspects be represented using fewer bits, and may thus reduce overhead.

An AP receiving the CSI feedback control field 1110a may use information therein to determine a CSI. In some aspects, such as the aspects where CSI is not transmitted by the STA as indicated by the CSI null sub-field 1234, the AP may use previously received or stored CSI. In other aspects, the CSI may receive complete CSI from the AP, or may receive data representative of a difference and may thereafter calculate current CSI from the difference and a previously stored CSI, for example as indicated by the difference CSI sub-field 1238.

In some aspects, the AP may adjust parameters for sending information to the STA based on information in the CSI feedback control field 1110a. For example, when the NDPA/NDP not received sub-field 1236 indicates that a previously transmitted NDPA or NDP was not received, the AP may transmit the NDPA or NP again, or may reduce a rate such as a PHY rate used to send future NDPAs and/or NDPs. If the NDPA/NDP not received sub-field 1236 indicates that a previously transmitted NDPA and NDP was received, the AP may increase the rate or may adjust another parameter like a modulation scheme. Further, if the CSI feedback control field 1110a indicates that a channel has not changed or has changed very little, for example using the NDPA/NDP not received sub-field 1236 and/or the difference CSI sub-field 1238, the AP may decrease the frequency at which it requests CSI from the STA. Similarly, if the AP receives complete CSI every time or the channel appears to be rapidly changing, the AP may increase the frequency at which it requests CSI from the STA.

Figure 12B:
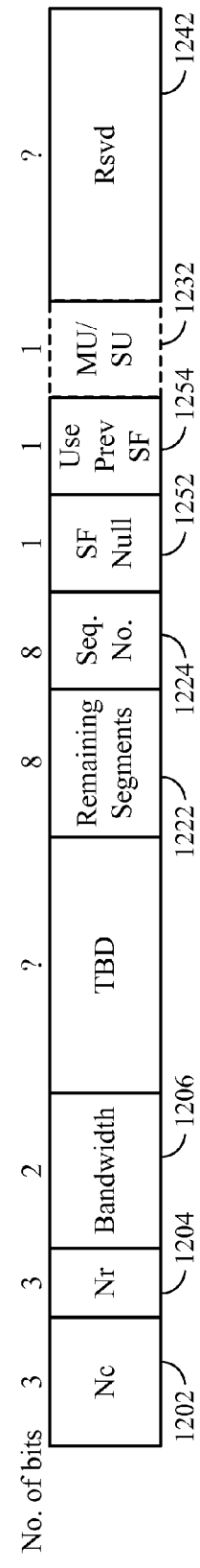

In some aspects, one or more of the fields 1202-1242 are omitted from the CSI feedback control field 1110. Further, additional fields may be included in the CSI feedback control field 1110. In some aspects, some of the bits in the STA information 612 are reserved for other or future uses. For example, CSI feedback control field 1110b illustrated in FIG. 12B shows an aspect including the Nc sub-field 1202, Nr sub-field 1204, bandwidth sub-field 1206, remaining segments sub-field 1222, sequence number sub-field 1224, and optionally the MU/SU sub-field 1232. In addition, the CSI feedback control field 1110b includes an SF null sub-field 1252 and a use previous SF sub-field 1254.

In the illustrated aspect, the SF null sub-field 1252 comprises at least 1 bit. The SF null sub-field 1252 may indicate whether SF is being transmitted by the STA. In some aspects, the SF null sub-field is configured similar to and/or used similar to the CSI null sub-field 1234.

In the illustrated aspect, the use previous SF sub-field 1254 comprises at least 1 bit. The use previous SF sub-field 1254 may indicate whether SF previously stored at the AP should be used. For example, when a previous SF stored field in an NDPA indicates that the previously transmitted SF has been stored at the AP, the use previous SF sub-field 1254 may be used to indicate that the stored SF should be used as the current SF, or to indicate that the stored SF should be combined with a difference data that is being transmitted by the STA. In some aspects, if the SF null sub-field 1252 and the use previous SF sub-field 1254 indicate that no SF is being transmitted, the AP may infer that a previous NDPA frame and/or NDP frame was not received. Thus, the SF null sub-field 1252 may indicate that no CSI is being transmitted, while the use previous SF sub-field 1254 indicates a condition that caused the CSI not to be transmitted, such as channel information being missing or a difference between current SF and previous SF being negligible. A table summarizing one aspect of possible values of the SF null sub-field 1252 and the use previous SF sub-field 1254 is included below. The table shows how the values correspond to a potential transmission of CSI.

| SF Null | Use Prev SF | |
|---|---|---|
| 0 | 0 | Regular SF being transmitted |
| 1 | 0 | SF Null (No SF available) |
| 0 | 1 | Difference SF being transmitted |
| 1 | 1 | Use Prev SF (No SF in this frame) |

Figure 12C:
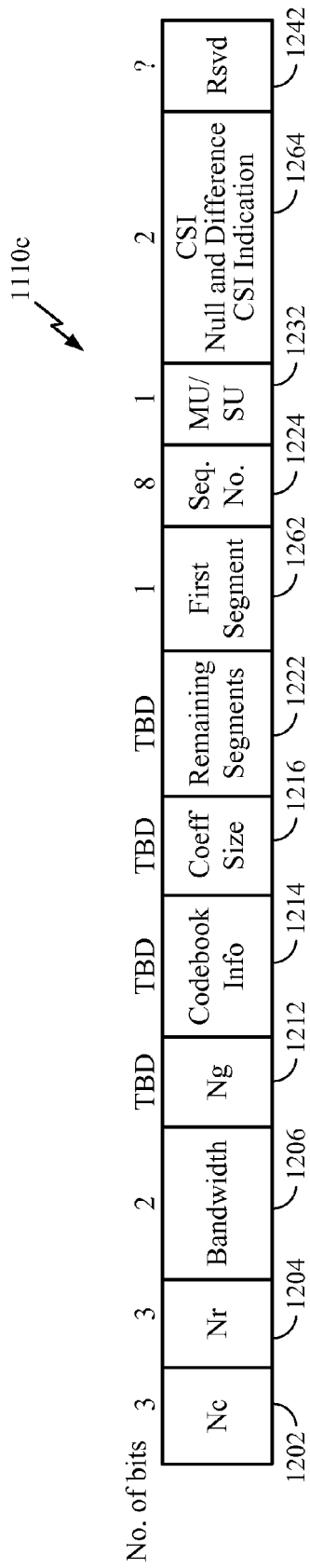

CSI feedback control field 1110c illustrated in FIG. 12C shows an aspect including the Nc sub-field 1202, Nr sub-field 1204, bandwidth sub-field 1206, remaining segments sub-field 1222, Ng sub-field 1212, codebook sub-field 1214, coefficient sub-field 1216, remaining segments sub-field 1222, sequence number sub-field 1224, and optionally the MU/SU sub-field 1232 and/or the reserved sub-field 1242. Each of these sub-fields may be configured as described with respect to FIG. 12A.

In contrast to the CSI feedback control field 1110a illustrated in FIG. 12A, however, the CSI feedback control field 1110c omits the CSI null sub-field 1234 and includes instead a first segment sub-field 1262. In the illustrated aspect, the first segment sub-field 1262 comprises at least 1 bit. The first segment sub-field 1262 may be used to indicate whether CSI feedback that is being transmitted is the first segment of that CSI. If an AP receives a CSI segment of a new CSI, but the first segment sub-field 1262 does not indicate that the received segment is the first segment of the new CSI, then the AP may determine that it missed at least one previously transmitted segment of the new CSI. The CSI may be identified as new using the sequence number sub-field 1224 and/or using the remaining segments sub-field 1222. For example, if the remaining segments sub-field 1222 associated with a previous CSI segment indicated that the segment was the last segment, any CSI segments that are received in the future may be determined to be associated with new CSI.

Further, the NDPA/NDP not received sub-field 1236 and the difference CSI sub-field 1238 illustrated in FIG. 12A have been replaced with a single CSI null and difference sub-field 1264 in the CSI feedback control field 1110c. In the illustrated aspect, the CSI null and difference sub-field 1264 comprises at least 2 bits. Implementing the CSI null and difference sub-field 1264 in this way allows the CSI feedback control field 1110c to be implemented using the same number of bits as the CSI feedback control field 1110a. The CSI null and difference sub-field 1264 may indicate whether regular SF is being transmitted, whether a difference between current SF and previous SF is negligible, and/or whether SF is not available. In one aspect, SF may not be available if a corresponding NDP or NDPA frame was not received. Those of skill in the art will appreciate that the CSI null and difference sub-field 1264 may be used to indicate the same or similar information as indicated by one or more of the CSI null sub-field 1234, NDPA/NDP not received sub-field 1236, difference CSI sub-field 1238, SF null sub-field 1252, and use previous SF sub-field 1254. One aspect of possible values of the CSI null and difference sub-field 1264 is summarized in the table below. The table illustrates how the values correspond to a potential transmission of CSI.

| CSI null and difference sub-field | | Action |
|---|---|---|
| 0 | 0 | Regular feedback |
| 0 | 1 | SF not available: may be set if NDPA or NDP frame was not received |
| 1 | 0 | Zero difference indicates that NDPA or NDP frame was received, but no CSI needs to be sent |
| 1 | 1 | Reserved, or indicates that the CSI feedback is a difference CSI |

Those of skill in the art that other values or combinations of values may correspond to the listed actions. For example, the actions associated with "0 1" and "1 1" may be transposed in the table above.

In the table above, values of "1 1" may be used to indicate that CSI feedback being transmitted is a difference CSI. In other aspects, the values of "1 1" may be reserved. In some aspects, the values of "1 1" may be used to indicate that CSI is not being included because transmission of the CSI feedback would exceed a transmission limitation, such as a PPDU or a TXOP limitation. For example, if a length of CSI feedback, such as the CSI Feedback 408, indicates that no SF is being transmitted, the values of "1 1" may indicate that the condition that caused the non-transmission is a PPDU or TXOP limitation.

In some aspects, if the length of the CSI Feedback 408 indicates that no SF is being transmitted, one or more of the indicators or sub-fields discussed above may be used to indicate a condition that caused the SF not to be transmitted. For example, the NDPA/NDP not received sub-field 1236, difference CSI sub-field 1238, use previous SF sub-field 1254, and/or the CSI null and difference sub-field 1264 may signify what the condition is. In other aspects, a new field may be defined to indicate the condition. In still other aspects, one or more bits that would be used for another purpose when CSI is being transmitted can be used to provide this indication. For example, one or more of the bits in the remaining segments field 1222 may be used to indicate the condition if a length of the CSI Feedback 408 indicates that SF is not being transmitted.

Figure 12D:
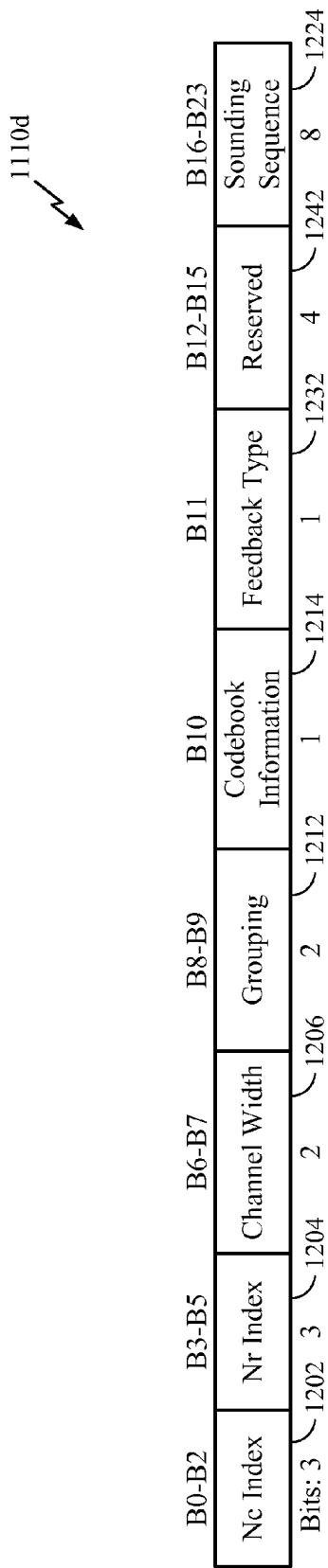

CSI feedback control field 1110*d* illustrated in FIG. 12D shows an aspect including the Nc sub-field 1202, Nr sub-field 1204, bandwidth sub-field 1206, Ng sub-field 1212, codebook sub-field 1214, sequence number sub-field 1224, and the MU/SU sub-field 1232. In the illustrated aspect, however, the bandwidth sub-field 1206 is illustrated as a channel width sub-field. Further, the Ng sub-field 1212 is illustrated as a grouping sub-field. Additionally, the MU/SU sub-field 1232 is illustrated as a feedback type sub-field, and the sequence number sub-field 1224 is illustrated as a sounding sequence sub-field. Each of these sub-fields may be configured as described with respect to FIG. 12A.

The CSI feedback control field 1110*d* further includes the reserved sub-field 1242. In the aspect illustrated in FIG. 12D, the reserved sub-field 1242 may be used to indicate whether CSI will be transmitted. Thus, the reserved sub-field 1242 may indicate that the frame of CSI feedback 408 is a null feedback frame, for example omitting information from the CSI feedback field 1112 or wholly omitting the CSI feedback field 1112. The reserved sub-field 1242 may therefore be used in some aspects to indicate information similar to the CSI null sub-field 1234 discussed above.

In the aspect illustrated in FIG. 12D, the reserved sub-field 1242 may instead or additionally be used to indicate whether CSI feedback that is being transmitted is the first segment of that CSI. The reserved sub-field 1242 may therefore be used in some aspects to indicate information similar to the first segment sub-field 1262 discussed above.

In the aspect illustrated in FIG. 12D, the reserved sub-field 1242 may instead or additionally be used to indicate a number of remaining segments of the CSI feedback or SF that remains to be transmitted after the current MPDU. The reserved sub-field 1242 may therefore be used in some aspects to indicate information similar to the remaining segments sub-field 1222 discussed above. Thus, the reserved sub-field 1242 may indicate which one of a plurality of feedback segments is first and how many segments of the feedback are missing. Indicating first and remaining segments may alert a receiver, such as an AP, of how many segments to expect and whether the segments have all been received.

In the aspect shown in FIG. 12D, the reserved sub-field 1242 is illustrated as comprising four bits. In one aspect, one of the four bits may be used to indicate whether a segment of feedback being transmitted is a first segment. For example, a bit value of "1" may be used to indicate that the segment is a first segment, and a bit value of "0" may indicate that the segment is not a first segment. In some aspects, B15 is used as the one bit.

In such aspects, one or more of the remaining bits in the reserved sub-field 1242 may be used to indicate a number of segments remaining to be transmitted. For example, if bit B15 is used to indicate whether the segment being transmitted is a first segment, bits B12-B14 may be used to indicate the number of remaining segments. A value of "111" may indicate that seven segments are remaining, a value of "110" may indicate that six segments are remaining, and so on. If a single segment is being transmitted, the first segment bit may be set to "1" and the remaining segments bits all set to "0." If B12-B14 indicate the number of remaining segments and B15 indicates whether the segment is a first segment, the reserved sub-field 1242 may therefore have a value of "0001" to indicate that a single segment of feedback is being transmitted.

In some aspects, feedback may be split into no more than eight segments. In these aspects, there can be at most seven segments remaining Seven segments may be remaining, however, only if the segment being transmitted is the first segment. Thus, there would be no circumstance in which a segment that is not the first segment would indicate that seven segments are remaining. In such aspects, the first segment bit may be set to "0" and the remaining segments bits all set to "1" to indicate that CSI is not being transmitted. If B12-B14 indicate the number of remaining segments and B15 indicates whether the segment is a first segment, the reserved sub-field 1242 may therefore have a value of "1110" to indicate that a null feedback frame is being transmitted. Thus, an indication that a first segment is not being transmitted in combination with an indication that the maximum number of remaining segments have yet to be transmitted may alert a receiver, such as an AP, that no CSI is being transmitted.

In some aspects, if the reserved sub-field 1242 indicates that no CSI is being transmitted, all of the bits preceding the reserved sub-field 1242 may be used as reserved bits. Thus, if a null feedback frame is transmitted, bits B0-B11 may be reserved. In some aspects, one or more of these bits may be used to indicate a condition that caused the CSI not to be transmitted.

For example, bits B10-B11 may be used to a reason that feedback is missing. The reason may relate to the reception of sounding information, a transmission limitation, or calculated CSI, among other reasons. In some aspects, B10-B11 are set to a value of "00" if sounding information is missing, for example if an NDPA or NDP frame was not received or was received incorrectly. In some aspects, B10-B11 are set to a value of "01" if feedback cannot be sent due to a TXOP limitation. In some aspects, B10-B11 are set to a value of "10" if feedback cannot be sent due to a PPDU limitation. In some aspects, B10-B11 are set to a value of "11" if previously transmitted channel state information is substantially similar to current channel state information. In some aspects, the value of "11" is reserved for B10-B11.

In the aspect illustrated in FIG. 12D, the coefficient size sub-field is omitted. Further, the MU/SU sub-field 1232 is disposed before any remaining segments, first segment, and null feedback information or indicators. Additionally, the sequence number sub-field 1224 is disposed after such information or indicators, and therefore after the reserved field 1242.

Figure 12E:
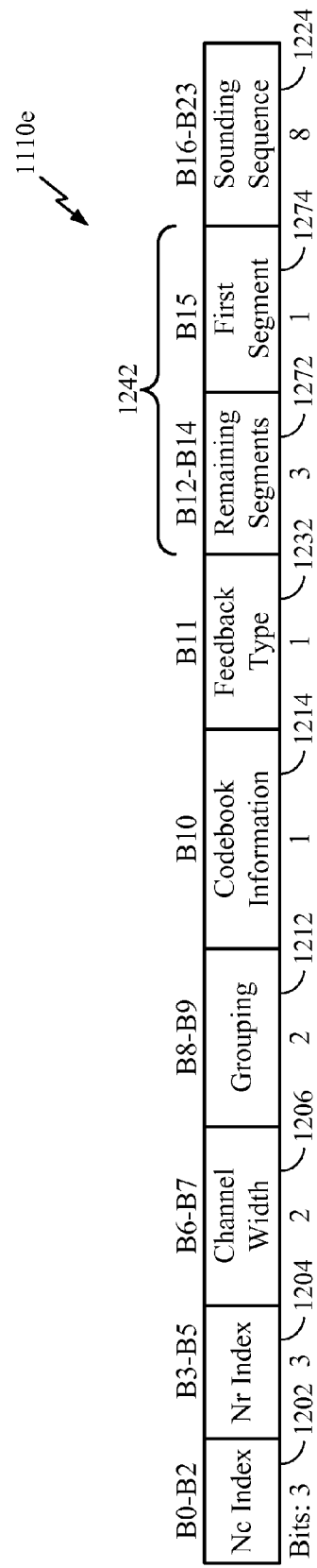

FIG. 12E illustrates an aspect of CSI feedback control field 1110*e* showing the reserved sub-field 1242 being split into a remaining segments sub-field 1272 and a first segment sub-field 1274. In the illustrated aspect, the remaining segments sub-field 1272 comprises bits B12-B14 of the field 1110*e* and the first segment sub-field 1274 comprise bit B15 of the field 1110*e*. The remaining segments sub-field 1272 may be used to convey similar information or configured similar to the remaining segments sub-field 1222 discussed above. The first segment sub-field 1274 may be used to convey similar information or configured similar to the first segment sub-field 1262 discussed above. When considered together, the remaining segments sub-field 1272 and the first segment sub-field 1274 may be used to convey similar information as the CSI null sub-field 1234 and/or the SF null sub-field 1252 discussed above.

The remaining segments sub-field 1272 and the first segment sub-field 1274 may be set to various values as described above with respect to bits B12-B14 and B15, respectively, to indicate information about CSI feedback. Example values of these sub-fields, as well as the remaining sub-fields 1202-1232 of the field 1110e, are enumerated in the table below. The values below are only illustrative, and are not intended to be limiting. One having ordinary skill in the art will appreciate that other values may be used or other information may be indicated by the illustrated values.

| Sub-field | Values and Description of Indicated Information |
|---|---|
| Nc Index | Indicates the number of columns in a matrix minus one:<br>Set to 0 for Nc = 1<br>Set to 1 for Nc = 2<br>...<br>Set to 7 for Nc = 8 |
| Nr Index | Indicates the number of rows in a matrix minus one:<br>Set to 0 for Nr = 1<br>Set to 1 for Nr = 2<br>...<br>Set to 7 for Nr = 8 |
| Channel Width | Indicates the width of the channel in which a measurement was made:<br>Set to 0 for 20 MHz<br>Set to 1 for 40 MHz<br>Set to 2 for 80 MHz<br>Set to 3 for 160 MHz or 80 + 80 MHz |
| Grouping | Number of carriers grouped into one:<br>Set to 0 for Ng = 1 (No grouping)<br>Set to 1 for Ng = 2<br>Set to 2 for Ng = 4<br>The value 3 is reserved |
| Feedback Type | Set to 0 if the feedback report is for SU-BF. If it is set to 0, the feedback report frame shall not include the MU Exclusive Beamforming Report field.<br>Set to 1 if the feedback report is for MU-BF. If it is set to 1, the feedback report frame shall include the MU Exclusive Beamforming Report field |
| Codebook Information | Indicates the size of codebook entries:<br>If Feedback Type is set to 0 (SU-BF)<br>Set to 0 for 2 bit for ip, $\psi$ bits for $\phi$<br>Set to 1 for 4 bit for ip, $\psi$ bits for $\phi$<br>If Feedback Type is set to 1 (MU-BF)<br>Set to 0 for 5 bit for ip, $\psi$ bits for $\phi$<br>Set to 1 for 7 bit for ip, $\psi$ bits for $\phi$ |
| Remaining segments | Contains the remaining segment number for the associated measurement report.<br>Valid range: 0 to 7.<br>Set to 0 for the last segment of a segmented report or the only segment of an unsegmented report.<br>When First segment is set to 0, Remaining segments equal to 7 indicates the frame is a Null Feedback frame, e.g. the VHT Compressed Beamforming Report and MU Exclusive Beamforming Report fields are not present. |
| First segment | Set to 1 if the segment is the first. Set to 0 if the segment is the only segment. |
| Sounding Sequence | Sequence number from the NDPA soliciting feedback. |

Figure 13:
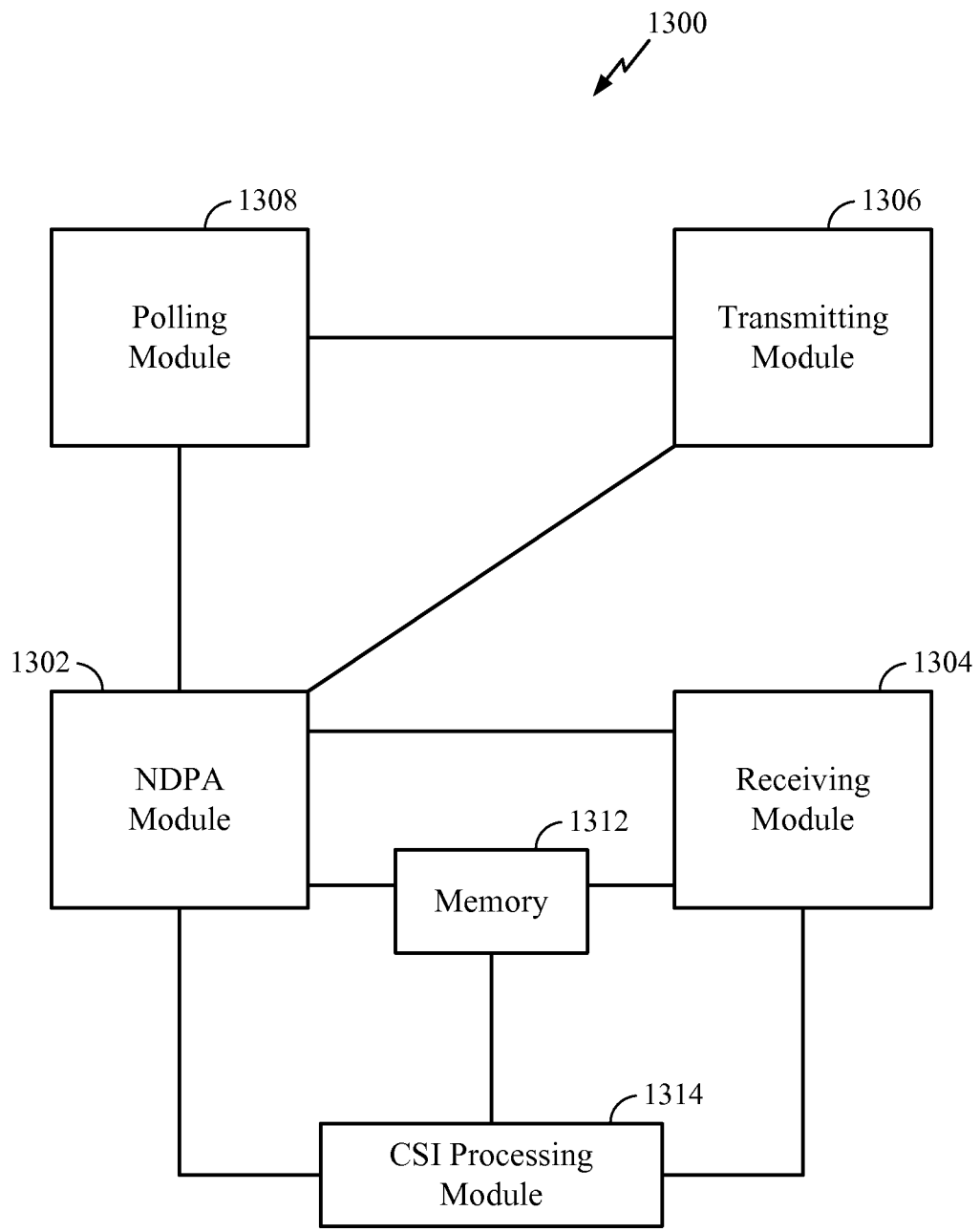
FIG. 13 illustrates an aspect of an access point.

FIG. 13 illustrates an aspect of an access point (AP) 1300 for use within the system 100. The AP 1300 may comprise the AP 110 illustrated in FIG. 1 or FIG. 2. As discussed above, the AP 1300 may be implemented as a wireless device, for example as a wireless device 302 illustrated in FIG. 3. The AP 1300 may be used to communicate with a user terminal or STA as described above with respect to FIGS. 4-12.

The AP 1300 may comprise an NDPA module 1302 for generating an NDPA frame, for example the NDPA frame 402 or 422. When generating an NDPA frame, the NDPA module 1202 may determine whether SF was received from an STA in response to a previous NDPA frame or in response to a polling message. The SF may be received by a receiving module 1204, for example, and the NDPA frame may have been transmitted by a transmitting module 1206. The polling message may be generated by a polling module 1208. The result of this determination may be included in the NDPA frame, for example in a last SF received field as discussed above.

The NDPA module 1302 may further determine whether the last SF polled for by the polling module 1308 was stored, for example stored in a memory 1312. The result of this determination may be included in the NDPA frame, for example in a last SF stored field or a previous SF stored field as discussed above.

In some aspects, the NDPA module 1302 is configured to wrap an NDPA frame in a control wrapper, for example as shown in FIG. 9A or FIG. 9B. In these aspects, the NDPA module 1302 may be configured to determine an HT-control field and/or MCS for an STA to send requested CSI. The NDPA module 1302 may also determine a rate at which the STA should use to send the requested CSI. The result of this determination may be included in the wrapped NDPA frame.

The NDPA module 1202 may be configured to determine one or more STAs from which CSI feedback information is being requested. Information identifying these STAs may be included in an STA information field, as described above with respect to FIGS. 6A-6C.

The NDPA module 1302 may be configured to determine parameters for each of the STAs to use for reporting CSI feedback. For example, the NDPA module 1202 may determine whether each STA or all of the STAs collectively should compute CSI for SU or MU. The NDPA module 1302 may further be configured to determine a number of spatial channels or streams (e.g., Eigen modes) of CSI feedback to be computed at the STAs, a grouping of tones on which the STAs are to generate CSI feedback, a coefficient size corresponding to a quantization used by the STAs for matrix entries of the CSI feedback, and/or codebook information indicating a quantization for angles that the STAs should use for CSI feedback, as described above with respect to FIG. 7. In some aspects, the NDPA module 1302 is configured to determine one or more of the above parameters based on whether the CSI feedback will be used for MU or SU.

In some aspects, the NDPA module 1302 is configured to determine a frequency for sending NDPA frames, for example based at least in part on CSI or changing channel conditions indicated in CSI feedback, as discussed above. The NDPA module 1302 may further be configured to generate or determine any of the other information described above with respect to the NDPA frame 422. In some aspects, functionality of the NDPA module 1302 is implemented using at least the controller 230 illustrated in FIG. 2.

The receiving module 1304 may be used to receive control information, CSI feedback, and/or other communications from an STA such as communications indicating that no CSI feedback will be transmitted from the STA. The received data may be demodulated, downconverted, or otherwise processed by the receiving module 1304 or another module. The receiving module 1304 may be implemented using a receiver, for example the receiver 312 illustrated in FIG. 3, or a combination of receivers, for example the receivers 222a-222ap illustrated in FIG. 2. The receiving module 1304 may be implemented in a transceiver, and may comprise a demodulator and/or a receive data processor, for example the RX data processor 242. In some aspects, the receiving module 1304 comprises an antenna and a transceiver, for example the antenna 224 and the transceiver 222. The transceiver may be configured to demodulate inbound wireless messages. The messages may be received via the antenna.

The transmitting module 1306 may be used to transmit NDPA frames and/or polling messages. In some aspects, the transmitting module 1306 is configured to wirelessly transmit the NDPA frame, for example to the user terminal 120. The transmitting module 1306 may be implemented using a transmitter, for example the transmitter 310 illustrated in FIG. 3, or a combination of transmitters, for example the transmitters 222a-222ap illustrated in FIG. 2. The transmitting module 1306 may be implemented in a transceiver, and may comprise a modulator and/or a transmission data processor, for example the TX data processor 210. In some aspects, the transmitting module 1306 comprises an antenna and a transceiver, for example the antenna 224 and the transceiver 222. The transceiver may be configured to modulate outbound wireless messages going to a user terminal or STA. The messages may be transmitted via the antenna.

The polling module 1308 may be used to generate polling messages to transmit to the STAs, for example any of the CSI polls 412, 416. The polling module may determine which STA to transmit a polling message based on information received via the receiving module 1304. For example, remaining segment information received in a control message or field via the receiving module 1304 may be used by the polling module 1308 to generate a polling message.

In some aspects, the polling module 1308 is configured wrap a polling message in a control wrapper, for example as shown in FIG. 10. In these aspects, the polling module 1308 may be configured to determine an HT-control field and/or MCS for an STA to send requested CSI. The result of this determination may be included in the wrapped polling message.

The polling module 1308 may further be configured to generate or determine any of the other information described above with respect to polling messages such as the CSI poll 412 or the CSI poll 416, or the frame 1000, for example to include the sequence number of an NDPA frame. In some aspects, functionality of the polling module 1308 is implemented using at least the controller 230 and/or the scheduler 234 illustrated in FIG. 2.

The memory 1312 may be configured to store CSI information received from one or more STAs, for example via the receiving module 1304. As described above, the CSI may be represented as a matrix, which may be stored in the memory 1312. Other formats for representing the CSI may additionally be stored in the memory 1312. In some aspects, CSI that has timed out or expired may be periodically deleted from the memory 1312. The memory 1312 may be volatile or nonvolatile, or may be a combination of both. In some aspects, functionality of the memory 1312 is implemented using at least the memory 232 illustrated in FIG. 2 or the memory 306 illustrated in FIG. 3.

The AP 1300 may further comprise CSI processing module 1314 for processing received CSI feedback, for example received using the receiving module 1304. The CSI processing module 1314 may be configured to process the CSI feedback using one or more of the parameters indicated in a received message, for example according to SU or MU. The CSI processing module 1314 may also be configured to process the CSI feedback using one or more of the parameters indicated in a previously transmitted frame, for example using the MCS transmitted in a wrapped frame.

In some aspects, the CSI processing module 1314 is configured to determine if a communication is received from an STA indicating that the STA has no CSI feedback to transmit. For example, a CSI null field may be received in a CSI feedback indicating that no CSI will be received or one or more values in a reserved field, such as a first segments field and a remaining segments field, may indicate that no CSI will be received. The CSI processing module may be configured to determine if previously stored CSI should be used, for example by evaluating an SF null field and a use previous SF field. In some aspects, the CSI processing field is configured to change a rate or modulation for transmitting CSI requests based on information received in the CSI feedback, as described above. In some aspects, the CSI processing module 1314 may determine that no CSI will be received based on a length of the communication. The CSI processing module 1314 may also be configured to determine a condition that caused the CSI not to be received.

In some aspects, the CSI processing module 1314 is configured to generate CSI from a difference received in a CSI feedback. For example, when a difference CSI field or use previous SF field indicates that data representative of a difference between current CSI and a previously stored CSI is being transmitted, the CSI processing module 1314 may determine the current CSI using the difference data and CSI stored in the memory 1312.

In some aspects, the CSI processing module 1314 is configured to analyze received CSI feedback to determine a frequency for sending NDPA frames, for example based at least in part on CSI or changing channel conditions indicated in CSI feedback. This information may be communicated to the NDPA module 1302. In some aspects, functionality of the CSI processing module 1210 is implemented using at least the controller 230 and/or the RX data processor 242 illustrated in FIG. 2.

Those of skill in the art will appreciate various circuits, chips, modules, and/or components, which may comprise either software or hardware or both, that may be used to implement the modules described above with respect to the AP 1300. One or more of the modules of the AP 1300 may be partially or wholly implemented in the processor 304 illustrated in FIG. 3.

Figure 14:
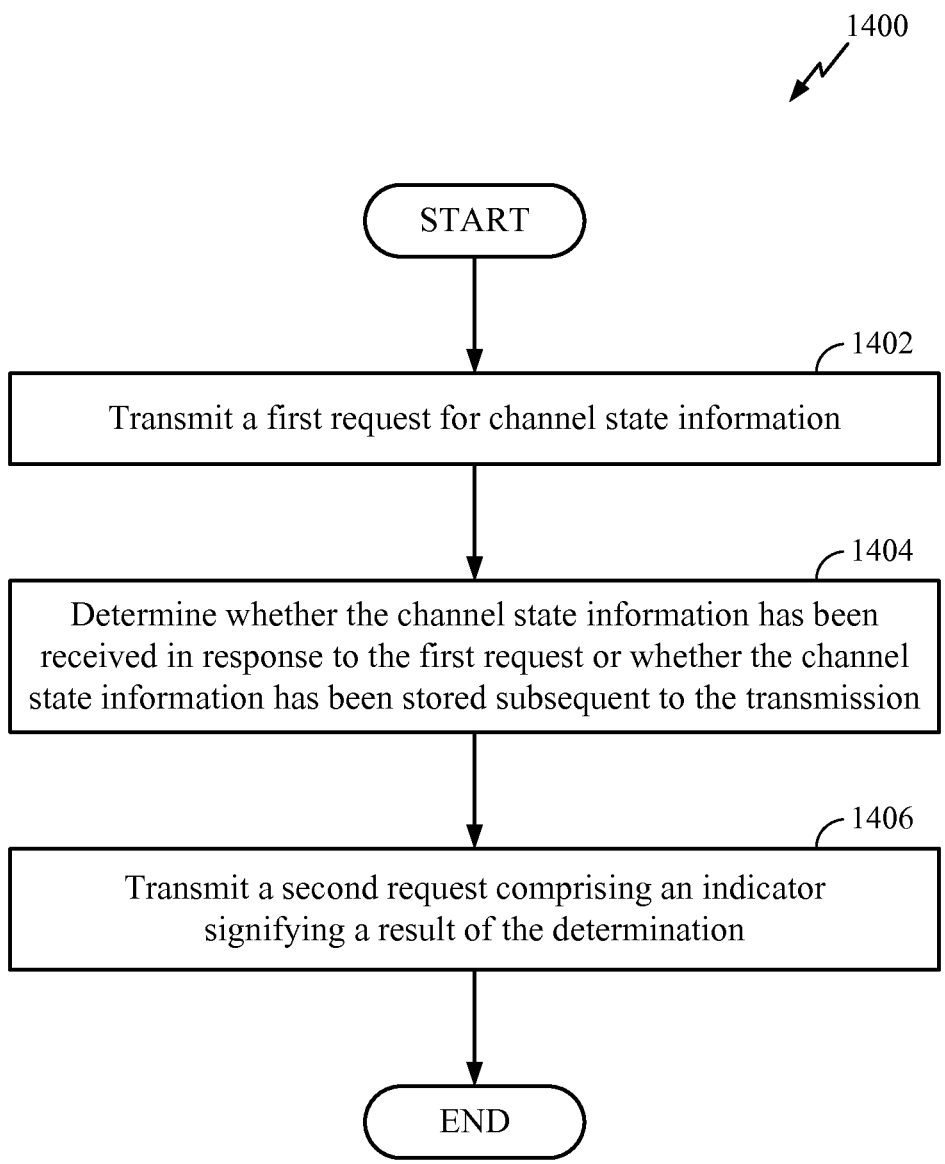
FIG. 14 illustrates an aspect of a method of communication.

FIG. 14 illustrates an aspect 1400 of a method for communication. The method may be implemented by the AP 1200, for example, to request channel state information from an STA and to optionally inform the STA of whether past SF has been received from the STA and/or stored at the AP. Although the method below will be described with respect to elements of the AP 1200, those of skill in the art will appreciate that other components may be used to implement one or more of the steps described herein.

At step 1402, a first request for channel state information is transmitted, for example using the transmitting module 1204. The first request may comprise a null data packet announcement or a polling message, for example. The NDPA module 1302 or the polling module 1308 may be used to generate the request.

Proceeding to step 1404, it is determined whether the channel state information has been received in response to the first request or whether the channel state information has been stored subsequent to the transmission. This determination may be performed by the CSI processing module 1314, for example. The channel state information may be received at the receiving module 1304, or may be stored in the memory 1312.

Moving to step 1406, a second request comprising an indicator signifying a result of the determination is transmitted, for example using the transmitting module 1306. The second request may comprise an NDPA frame, for example. In some aspects, the result of the determination is indicated in a last SF received field, a last SF stored field, or a previous SF stored field, as discussed above with respect to FIG. 7. The NDPA module 1302 and/or the CSI processing module 1314 may be used in creating the second request.

Figure 15:
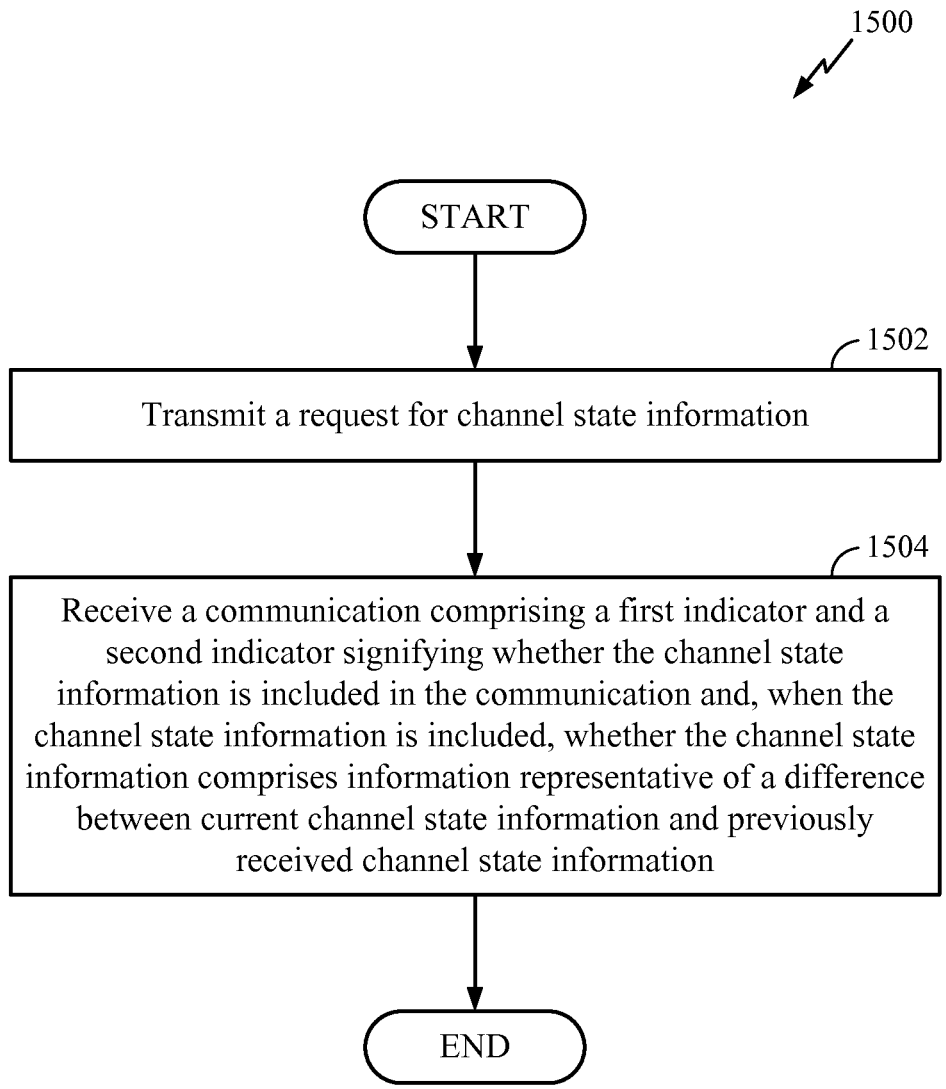
FIG. 15 illustrates an aspect of a method of communication.

FIG. 15 illustrates an aspect 1500 of a method for communication. The method may be implemented by the AP 1200, for example, to receive data representative of a portion of channel state information, or to receive notice that the channel state information will not be transmitted. In some aspects, the method 1500 may be used to determine why channel state information is not being transmitted from an STA. Although the method below will be described with respect to elements of the AP 1200, those of skill in the art will appreciate that other components may be used to implement one or more of the steps described herein.

At step 1502, a request for channel state information is transmitted, for example by the transmitting module 1306. Thereafter, at step 1504, a communication is received. The communication may comprise a first indicator and a second indicator signifying whether the channel state information is included in the communication. If the first indicator and/or the second indicator signifies that the channel state information is included, the first indicator and/or the second indicator further signifies whether the channel state information comprises information representative of a difference between current channel state information and previously received channel state information. The first and second indicators may comprise two or more of a CSI null field, a NDPA/NDP not received field, an SF null field, a use previous SF field, and/or a CSI null and difference field, as described above with respect to FIG. 12. The communication may be received using the receiving module 1304, for example. The communication may be processed by the CSI processing module 1314, for example, to determine if CSI information is included and/or to determine whether CSI stored at the AP will be used.

Figure 16:
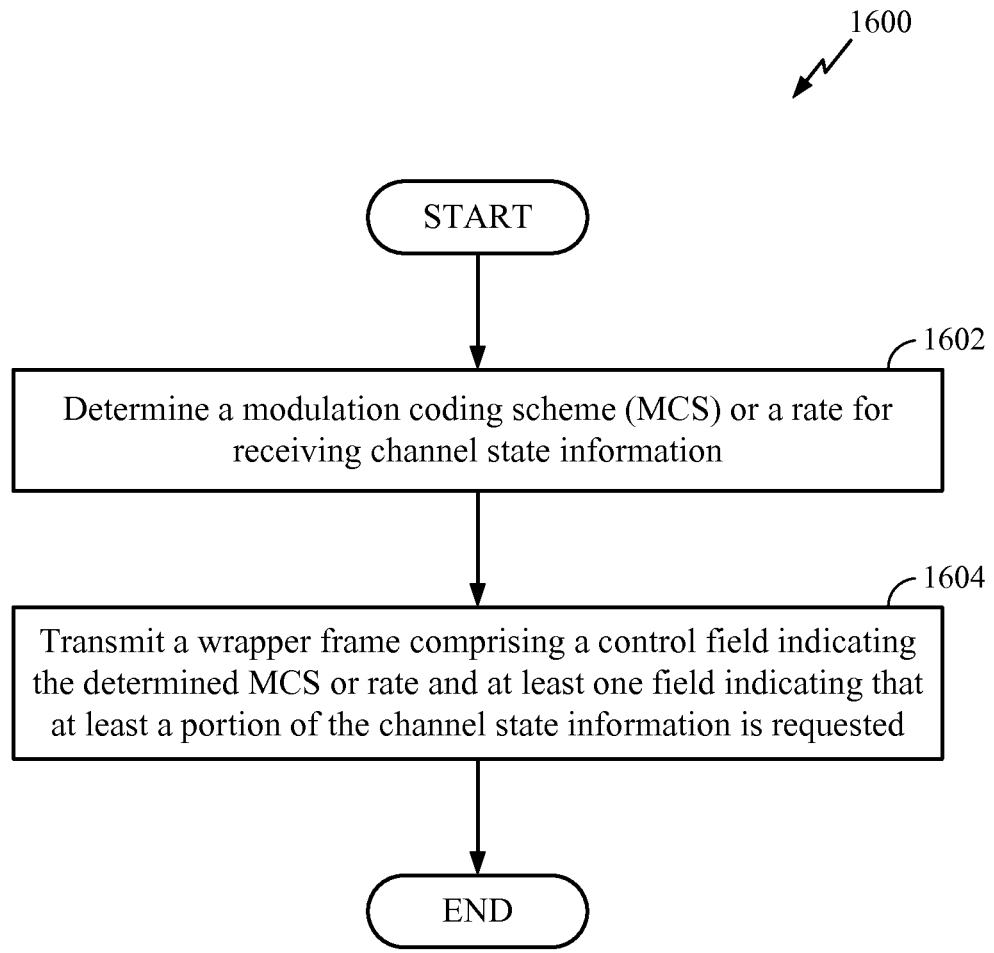
FIG. 16 illustrates an aspect of a method of communication.

FIG. 16 illustrates an aspect 1600 of a method for communication. The method may be implemented by the AP 1200, for example, to notify an STA of MCS for transmitting CSI. Although the method below will be described with respect to elements of the AP 1200, those of skill in the art will appreciate that other components may be used to implement one or more of the steps described herein.

At step 1602, a modulation coding scheme (MCS) or a rate for receiving channel state information is determined. In some aspects, the NDPA module 1302 may perform the determination. In other aspects, the polling module 1308 may determine perform the determination. In some aspects, the CSI processing module 1312 may be configured to perform a portion or all of the determination, for example based on communications received from an STA such as whether a state of a channel has been changing. The communications may be received using the receiving module 1304, for example.

Next, at step 1604, a wrapper frame is transmitted. The wrapper frame may comprise a control field indicating the determined MCS or rate and at least one field indicating that at least a portion of the channel state information is requested. The wrapper frame may comprise a wrapped NDPA frame, as discussed above with respect to FIG. 9A, or a wrapped polling message, as described above with respect to FIG. 10. The wrapper frame may be transmitted by the transmitting module 1306, for example.

Figure 17:
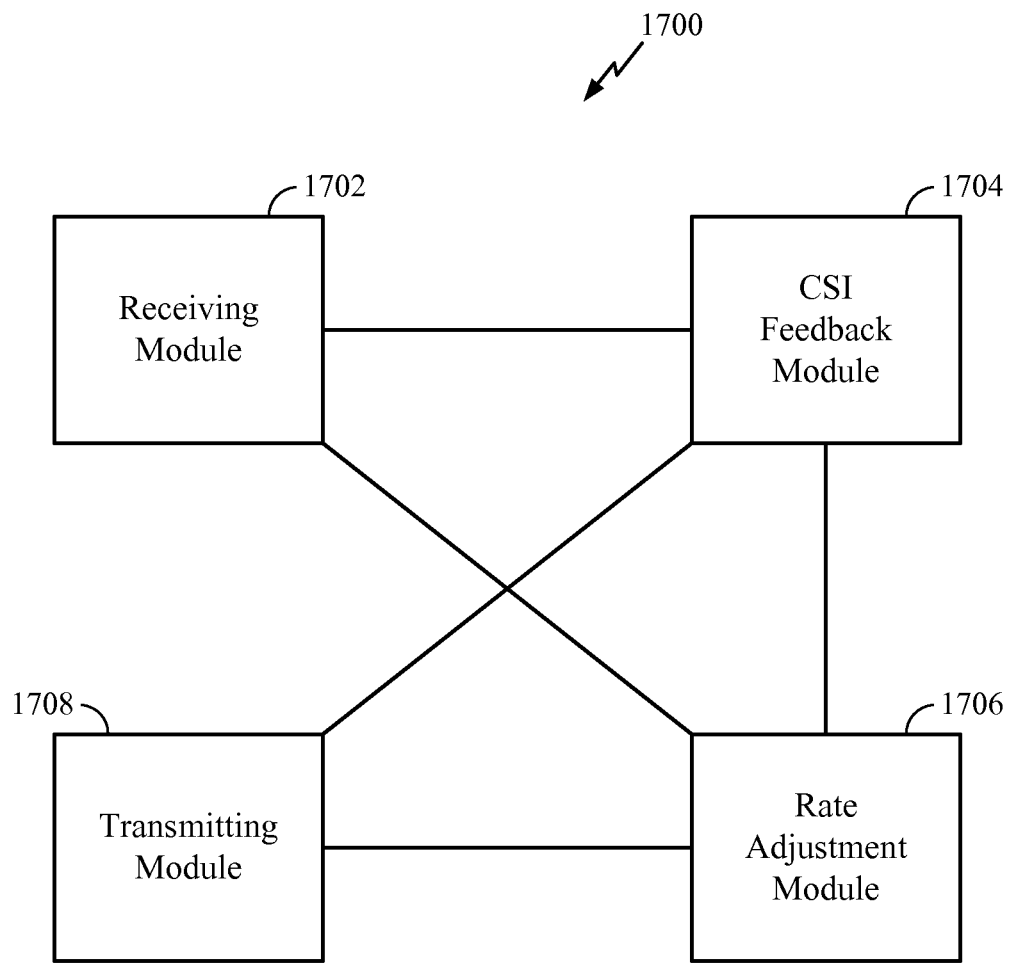
FIG. 17 illustrates an aspect of an access terminal.

FIG. 17 illustrates an aspect of a station (STA) 1700 for use within the system 100. The STA 1700 may comprise any of the user terminals 120 illustrated in FIG. 1 or FIG. 2. As discussed above, the STA 1700 may be implemented as a wireless device, for example as a wireless device 302 illustrated in FIG. 3. The STA 1700 may be used to communicate with an AP as described above with respect to FIGS. 4-12.

The STA 1700 may comprise a receiving module 1702 for receiving an NDPA frame and/or a CSI poll. For example, the receiving module 1702 may be configured to receive the NDPA frame 402 or 422 and/or either of the CSI polls 412, 416. Further, the receiving module 1702 may be configured to receive an NDP frame and frames that comprise wrapped NDPA frames or wrapped polling messages. Received data may be demodulated, downconverted, or otherwise processed by the receiving module 1702 or another module. The receiving module 1702 may be implemented using a receiver, for example the receiver 312 illustrated in FIG. 3, or a combination of receivers, for example the receivers 254m-254mu or 254xa-254xu illustrated in FIG. 2. The receiving module 1702 may be implemented in a transceiver, and may comprise a demodulator and/or a receive data processor, for example the RX data processor 270. In some aspects, the receiving module 1702 comprises an antenna and a transceiver, for example the antenna 252 and the transceiver 254. The transceiver may be configured to demodulate inbound wireless messages. The messages may be received via the antenna.

The STA 1700 may further comprise a CSI feedback module 1704 for determining CSI feedback. The CSI feedback module 1704 may be configured to determine the CSI feedback based on a received NDP frame associated with a received NDPA frame. The CSI may be represented as a matrix, as discussed above. Parameters of the CSI feedback may be determined in some aspects by the CSI feedback module 1704. In some aspects, the CSI feedback module is configured to determine MCS from a communication such as a control wrapper received via the receiving module 1702. For example, the CSI feedback module may determine MCS for CSI from an HT-control field included in a wrapped NDPA frame, as described above with respect to FIG. 9A.

The CSI feedback module 1704 may be configured to determine whether to compute regular/complete CSI, or whether to compute a difference between a previous CSI and current CSI. For example, the CSI feedback module 1704 may evaluate a last SF stored field or a previous SF stored field in an NDPA, as well as conditions of a channel, as discussed above. If a condition of the channel is substantially similar to a condition when a previous SF was stored, the CSI feedback module 1704 may determine not to send any CSI. In some aspects, the CSI feedback module 1704 may determine that SF has been stored at an AP, and may compute difference data to send to the AP to calculate current SF. The determinations of the CSI feedback module 1704 may be included in CSI feedback, for example in the CSI feedback 408 illustrated in FIGS. 11 and 12. In some aspects, the determinations may be indicated by a CSI null field, a difference CSI field, an SF null field, a use previous SF field, a CSI null and difference field, and/or one or more values in a reserved field such as a first segments field and a remaining segments field. A reason that caused the CSI feedback module 1704 not to send CSI may be indicated by an NDPA/NDP not received field, a difference CSI field, an SF null field, a use previous SF field, a CSI null and difference field, and/or in fields that become reserved once it is determined that no CSI will not be transmitted, for example in a CSI feedback communication transmitted to the AP. In some aspects, the CSI feedback module 1704 is configured to generate a CSI feedback communication having a length that indicates that the CSI will not be transmitted. In some aspects, the CSI feedback module 1704 may determine that CSI feedback will not be transmitted due to a transmission limitation, such as a PPDU or TXOP limitation.

The CSI feedback module 1704 may further be configured to generate or determine any of the other information described above with respect to the CSI feedback 408. In some aspects, functionality of the CSI feedback module 1704 is implemented using at least the controller 280 and/or the channel estimator 278. In some aspects, the CSI feedback module 1704 comprises a quantizer to quantize angles and/or entries in a matrix representing the CSI.

The STA 1700 may further comprise a rate adjustment module 1706 for determining an adjustment of a rate used to the send the CSI feedback determined by the CSI feedback module 1704. For example, the rate adjustment module 1706 may increase a PHY rate for sending the CSI feedback when a last SF received field in one or more received NDPA frames indicates that the CSI feedback that the STA 1700 has been transmitting has been successfully received. Similarly, the rate adjustment module 1706 may decrease a rate such as a PHY rate if a last SF received field, a last SF stored field, or a previous SF stored field indicates that a previously transmitted SF was not received or could not be stored. In some aspects, the rate adjustment module 1706 may adjust other parameters of the CSI feedback, for example a modulation of the CSI feedback. The rate adjustment module 1706 may determine or adjust a rate based on a control field in a wrapper, as discussed above. The rate adjustment module 1706 may also be configured to determine a rate at which a message, for example a polling message, is received, for example at the receiving module 1702.

The rate adjustment module 1706 may be configured to perform any of the rate adjustment procedures described above with respect to FIG. 7. In some aspects, functionality of the rate adjustment module 1706 is implemented using at least the controller 280. In some aspects, the rate adjustment module 1706 looks up values or parameters in a memory, such as the memory 282, for example to determine an appropriate rate or adjustment.

The STA 1700 further comprises a transmitting module 1708 may for transmitting CSI feedback. For example, the transmitting module 1708 may be configured to transmit the CSI feedback determined by the CSI feedback module 1704. The transmitting module may be configured to transmit at a rate determined by the rate adjustment module 1706 or using another parameter determined by the rate adjustment module 1706. In some aspects, the transmitting module 1708 is configured to wirelessly transmit the CSI feedback, for example to the AP 110. The transmitting module 1708 may be implemented using a transmitter, for example the transmitter 310 illustrated in FIG. 3, or a combination of transmitters, for example the transmitters 254*m*-254*mu* or 254*xa*-254*xu* illustrated in FIG. 2. The transmitting module 1708 may be implemented in a transceiver, and may comprise a modulator and/or a transmission data processor, for example the TX data processor 288. In some aspects, the transmitting module 1708 comprises an antenna and a transceiver, for example the antenna 252 and the transceiver 254. The transceiver may be configured to modulate outbound wireless messages going to an AP. The messages may be transmitted via the antenna.

Those of skill in the art will appreciate various circuits, chips, modules, and/or components, which may comprise either software or hardware or both, that may be used to implement the modules described above with respect to the STA 1700. One or more of the modules of the STA 1700 may be partially or wholly implemented in the processor 304 illustrated in FIG. 3.

Although described separately, it is to be appreciated that functional blocks described with respect to the AP 1300 and the STA 1700 need not be separate structural elements. Similarly, one or more of the functional blocks or portions of the functionality of various blocks may be embodied in a single chip. Alternatively, the functionality of a particular block may be implemented on two or more chips. In addition, additional modules or functionality may be implemented in the AP 1300 and the STA 1700. Similarly, fewer modules or functionalities may be implemented in the AP 1300 and the STA 1700, and the components of the AP 1300 and/or the STA 1700 may be arranged in any of a plurality of configurations. Additional or fewer couplings between the various modules illustrated in FIGS. 2, 3, 13 and 17 or between additional modules may be implemented.

Figure 18:
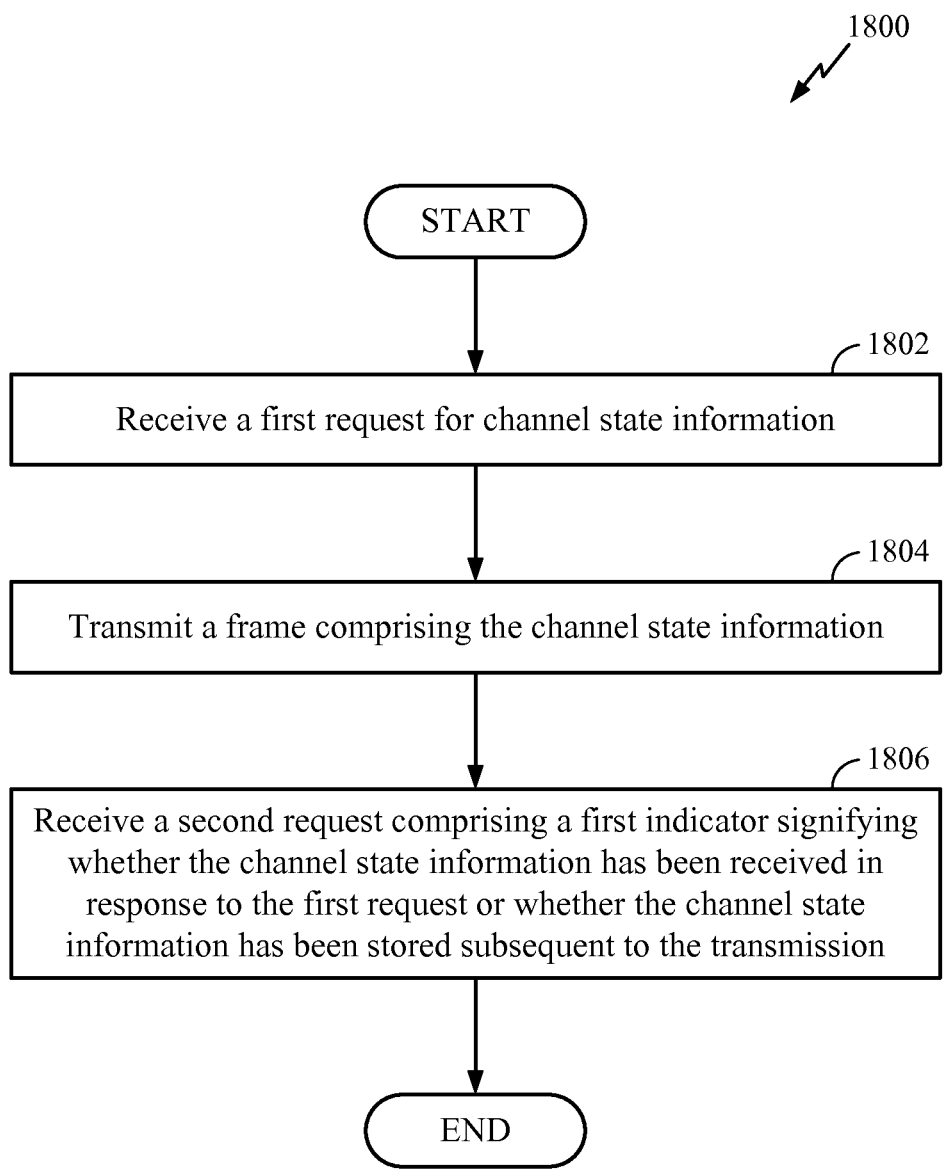
FIG. 18 illustrates an aspect of a method of communication.

FIG. 18 illustrates an aspect 1800 of a method for communication. The method may be implemented by the STA 1700, for example, to determine whether transmitted SF has been received and/or stored at an AP. Although the method below will be described with respect to elements of the STA 1700, those of skill in the art will appreciate that other components may be used to implement one or more of the steps described herein.

At step 1802, a first request for channel state information is received, for example using the receiving module 1702. The first request may comprise a null data packet announcement or a polling message, for example.

At step 1804, a frame comprising the channel state information is transmitted. The channel state information may be determined using the CSI feedback module 1704, for example, and may be transmitted using the transmitting module 1708, for example. The CSI feedback may be determined using the first request received at step 1802.

Proceeding to step 1806, a second request is received. The second request comprises a first indicator signifying whether the channel state information has been received in response to the first request or whether the channel state information has been stored subsequent to the transmission. The second request may be received using the receiving module 1702, for example. The second request may comprise an NDPA frame. In some aspects, the second request is processed by the CSI feedback module 1704 and/or the rate adjustment module 1706 to determine whether to send CSI feedback or to adjust a parameter such as a rate used to send the CSI.

Figure 19:
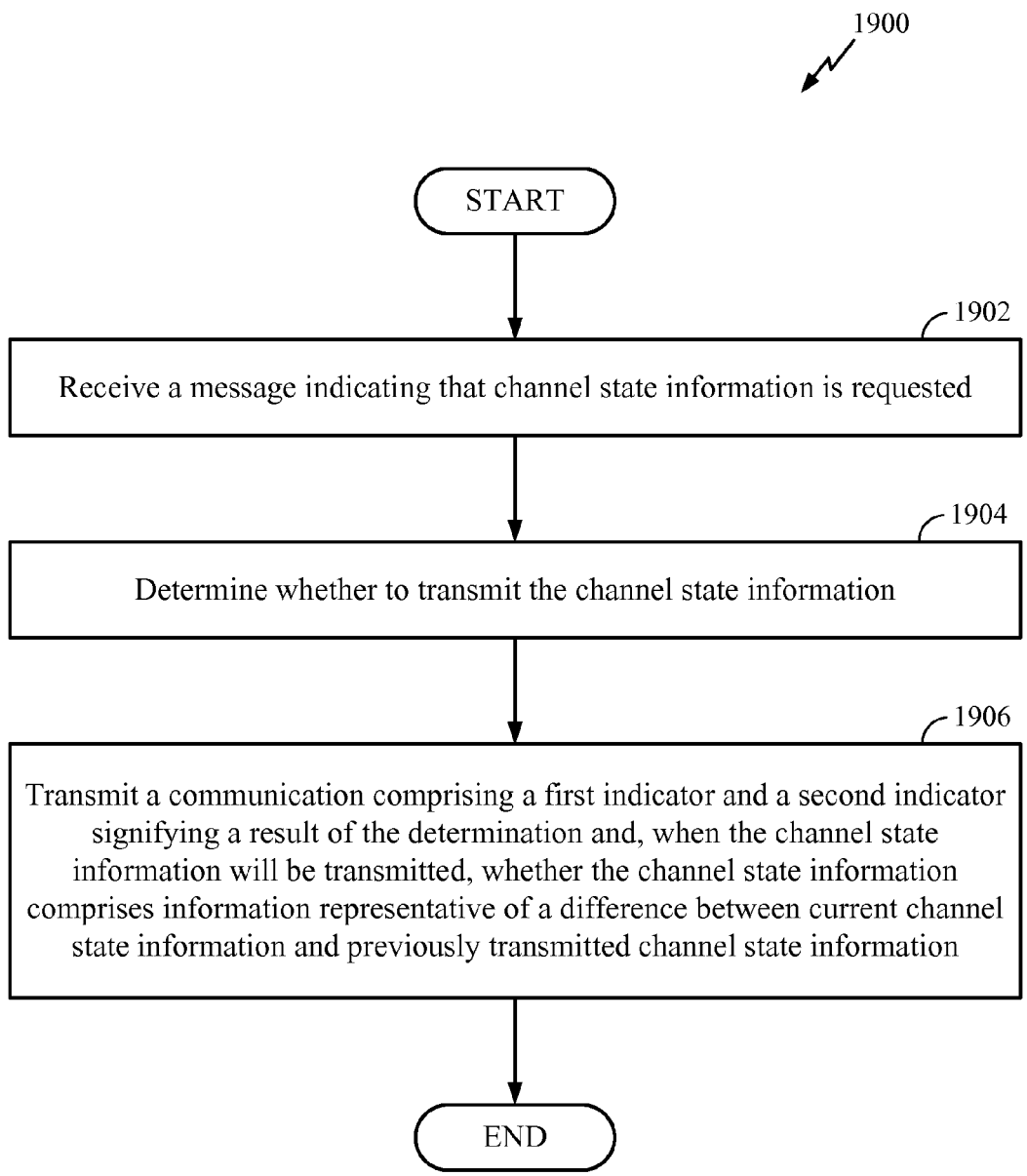
FIG. 19 illustrates an aspect of a method of communication.

FIG. 19 illustrates an aspect 1900 of a method for communication. The method may be implemented by the STA 1700, for example, to determine whether to transmit CSI, and in some aspects to indicate to an AP whether transmitted CSI comprises a difference CSI. Although the method below will be described with respect to elements of the STA 1700, those of skill in the art will appreciate that other components may be used to implement one or more of the steps described herein.

At step 1902, a message indicating that channel state information is requested is received, for example using the receiving module 1702. In some aspects, the message comprises an NDPA frame or a polling message. The message may indicate whether previously transmitted SF is stored at an AP.

Thereafter, at step 1904 it is determined whether to transmit the channel state information. The determination may be performed by the CSI feedback module 1704, for example. The CSI feedback module 1704 may evaluate whether a channel condition has changed, and whether CSI is stored at the AP, for example as described above.

Moving to step 1906, a communication is transmitted. The communication may comprise a first indicator and a second indicator signifying a result of the determination. If the first indicator and/or the second indicator signifies that the channel state information will be transmitted, the first indicator and/or the second indicator may signify whether the channel state information comprises information representative of a difference between current channel state information and previously transmitted channel state information. The first indicator may comprise a CSI null field, an SF null field, and/or a portion of a CSI null and difference field, for example. The second indicator may comprise a difference CSI field, a use previous SF field, and/or a portion of a CSI null and difference field, for example. The indicators may be determined by the CSI feedback module 1704, for example. The communication may comprise CSI feedback, for example the CSI feedback 408, or another communication indicating whether CSI will be transmitted. The communication may be transmitted using the transmitting module 1708, for example.

Figure 20:
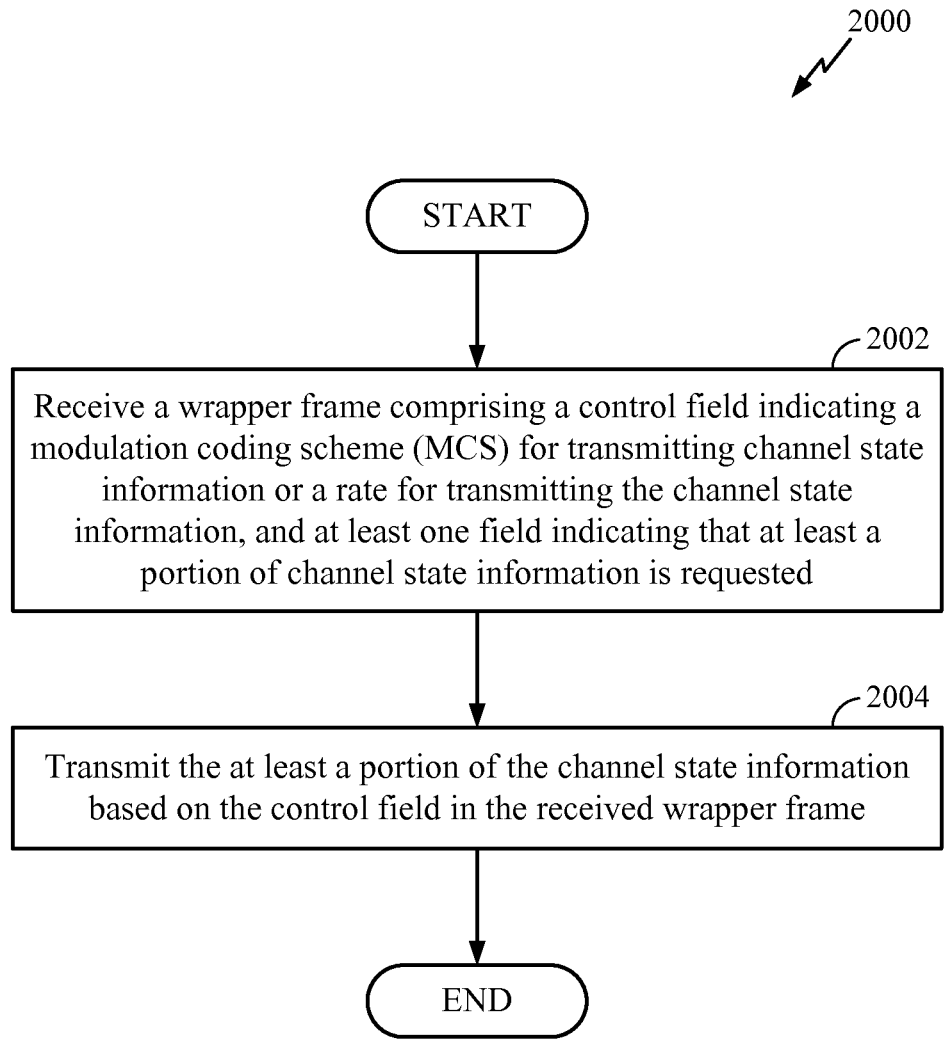
FIG. 20 illustrates an aspect of a method of communication.

FIG. 20 illustrates an aspect 2000 of a method for communication. The method may be implemented by the STA 1700, for example, to determine MCS for transmitting CSI. Although the method below will be described with respect to elements of the STA 1700, those of skill in the art will appreciate that other components may be used to implement one or more of the steps described herein.

At step 2002, a wrapper frame is received, for example using the receiving module 1702. The wrapper frame may comprise a control field indicating a modulation coding scheme (MCS) for transmitting channel state information, and at least one field indicating that at least a portion of channel state information is requested. The wrapper frame may comprise a wrapped NDPA frame, as discussed above with respect to FIG. 9A, or a wrapped polling message, as described above with respect to FIG. 10

Subsequently, at step 2004, at least the portion of the channel state information requested by the frame is transmitted, for example using the transmitting module 1708. The CSI feedback module 1704 and/or the rate adjustment module may extract MCS from the control field in the received wrapper frame to determine how to send the CSI. The channel state information may be transmitted as CSI feedback such as the CSI feedback 408. The channel state information may be determined by the CSI feedback module 1704, for example as described above.

Figure 21:
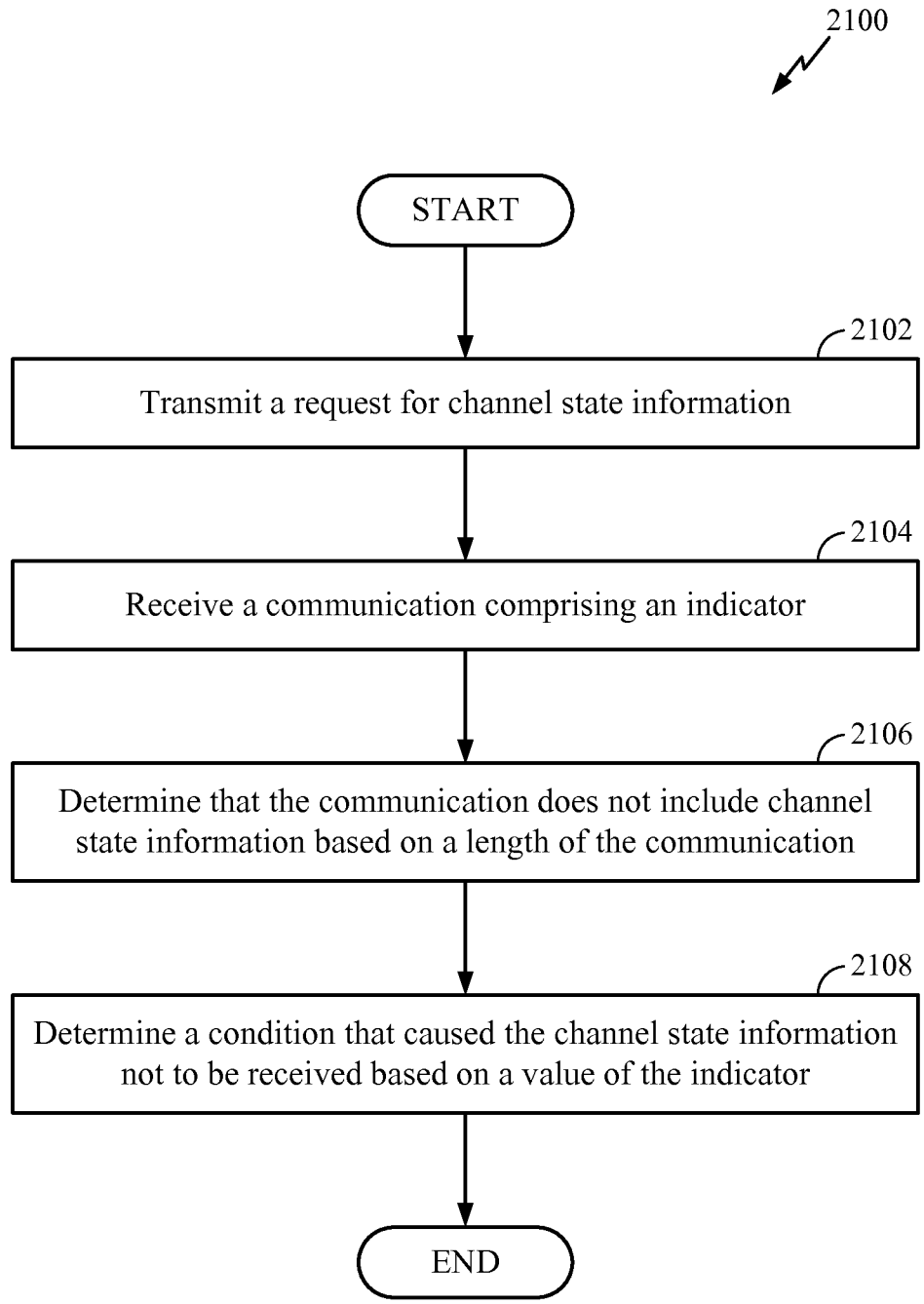
FIG. 21 illustrates an aspect of a method of communication.

FIG. 21 illustrates an aspect 2100 of a method for communication. The method may be implemented by the AP 1200, for example, to determine that channel state information will not be received, and to determine why the channel state information is not being transmitted from an STA. Although the method below will be described with respect to elements of the AP 1200, those of skill in the art will appreciate that other components may be used to implement one or more of the steps described herein.

At step 2102, a request for channel state information is transmitted, for example by the transmitting module 1306. Thereafter, at step 2104, a communication is received. The communication may comprise an indicator. The communication may be received using the receiving module 1304, for example.

After reception of the communication, it is determined that the communication does not include channel state information based on a length of the communication at step 2106. Further, at step 2108, a condition that caused the channel state information not to be received is determined based on a value of the indicator. The indicator may comprise a NDPA/NDP not received field, a use previous SF field, and/or a CSI null and difference field, as described above with respect to FIG. 12. The indicator may further comprise a bit, field, or other signifier indicative of whether a transmission limitation would be exceeded by transmitting the channel state information. The determining at step the 2106 and/or at the step 2108 may be performed by the CSI processing module 1314, for example.

Figure 22:
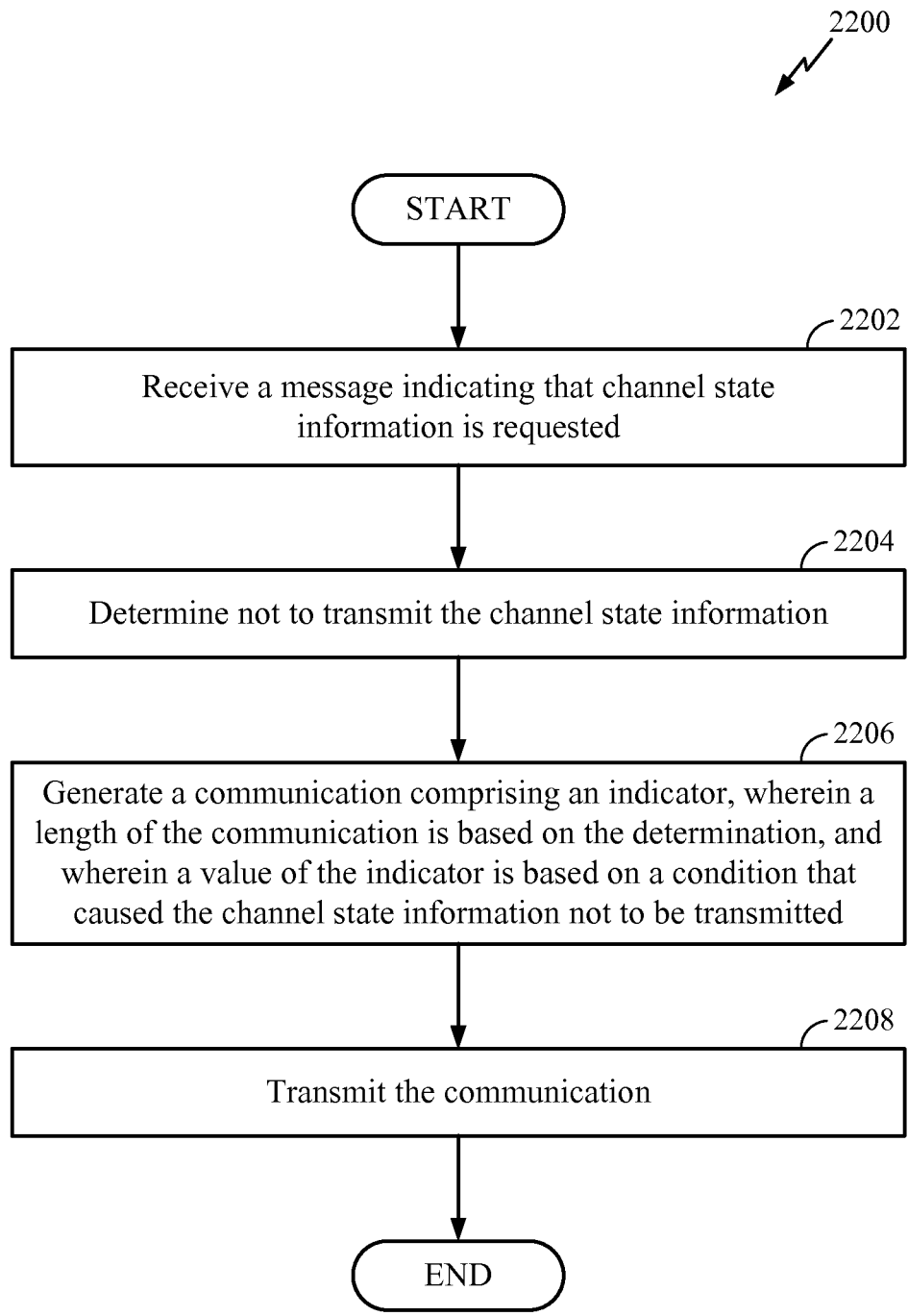
FIG. 22 illustrates an aspect of a method of communication.

FIG. 22 illustrates an aspect 2200 of a method for communication. The method may be implemented by the STA 1700, for example, to determine whether to transmit CSI, and to indicate to an AP a reason why CSI isn't being transmitted. Although the method below will be described with respect to elements of the STA 1700, those of skill in the art will appreciate that other components may be used to implement one or more of the steps described herein.

At step 2202, a message indicating that channel state information is requested is received, for example using the receiving module 1702. In some aspects, the message comprises an NDPA frame or a polling message. The message may indicate whether previously transmitted SF is stored at an AP.

Thereafter, at step 2204 it is determined not to transmit the channel state information. The determination may be performed by the CSI feedback module 1704, for example. The CSI feedback module 1704 may evaluate whether a channel condition has changed, whether CSI is stored at the AP, and/or whether a frame including the CSI would be too long for transmission, for example as described above.

Moving to step 2206, a communication comprising an indicator is generated. A length of the communication is based on the determination in step 2204. For example, a CSI feedback field may be omitted to make the communication a certain length. Further, a value of the indicator is based on a condition that caused the channel state information not to be transmitted. The indicator may comprise a difference CSI field, a use previous SF field, and/or a portion of a CSI null and difference field, for example. The indicator may further comprise a bit, field, or other signifier indicative of whether a transmission limitation would be exceeded by transmitting the channel state information The generation, and/or a determination of the length or value of the indicator may be determined by the CSI feedback module 1704, for example. The communication may comprise CSI feedback, for example the CSI feedback 408, or another communication indicating that CSI will not be transmitted. The indicator may be included in a control field of the CSI feedback.

At step 2208, the communication is transmitted. The communication may be transmitted using the transmitting module 1708, for example.

Figure 23:
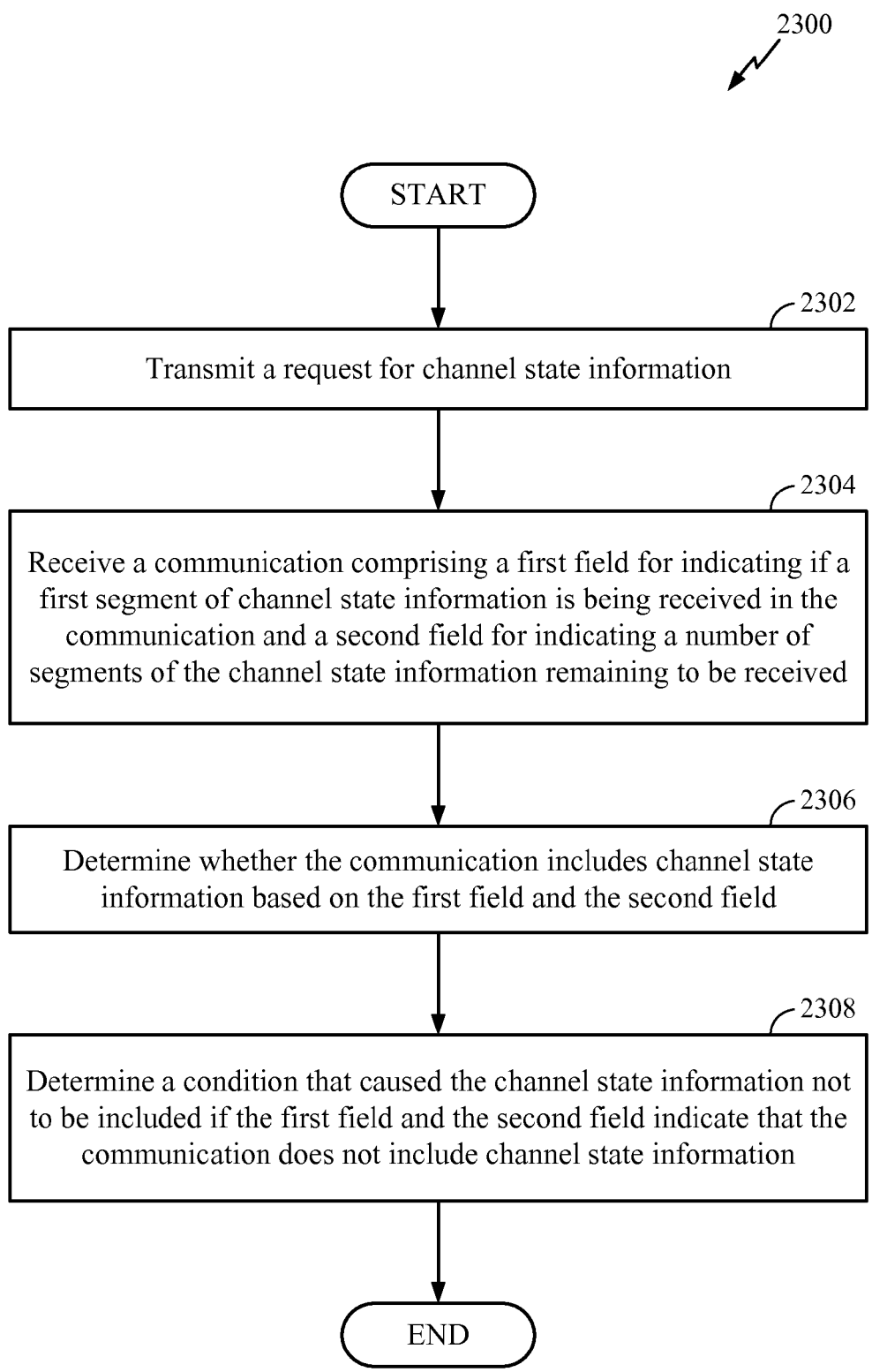
FIG. 23 illustrates an aspect of a method of communication.

FIG. 23 illustrates an aspect 2300 of a method for communication. The method may be implemented by the AP 1200, for example, to determine that channel state information will not be received, and to determine why the channel state information is not being transmitted from an STA. Although the method below will be described with respect to elements of the AP 1200, those of skill in the art will appreciate that other components may be used to implement one or more of the steps described herein.

At step 2302, a request for channel state information is transmitted, for example by the transmitting module 1306. Thereafter, at step 2304, a communication is received. The communication may comprise a first field for indicating if a first segment of channel state information is being received in the communication, and a second field for indicating a number of segments of the channel state information remaining to be received. The first and second field may be portions of a reserved field, such as a first segment field and a remaining segments field. The communication may be received using the receiving module 1304, for example.

After reception of the communication, it is determined whether the communication includes channel state information based on the first field and the second field at step 2306. For example, it may be determined that no channel state information is included in the communication if the first field indicates that a first segment of channel state information is not included in the communication and a value of the second field is at least as great as a maximum number of remaining segments.

Further, at step 2308, a condition that caused the channel state information not to be received is determined if the first field and the second field indicate that the communication does not include channel state information. The condition may be determined based at least in part on two or more bits adjacent to the first field or the second field. For example, bits that may be used for a different purpose may become reserved when the first field and second field indicate that the communication does not include the channel state information, as described above with respect to FIG. 12. The determining at step the 2306 and/or at the step 2308 may be performed by the CSI processing module 1314, for example.

Figure 24:
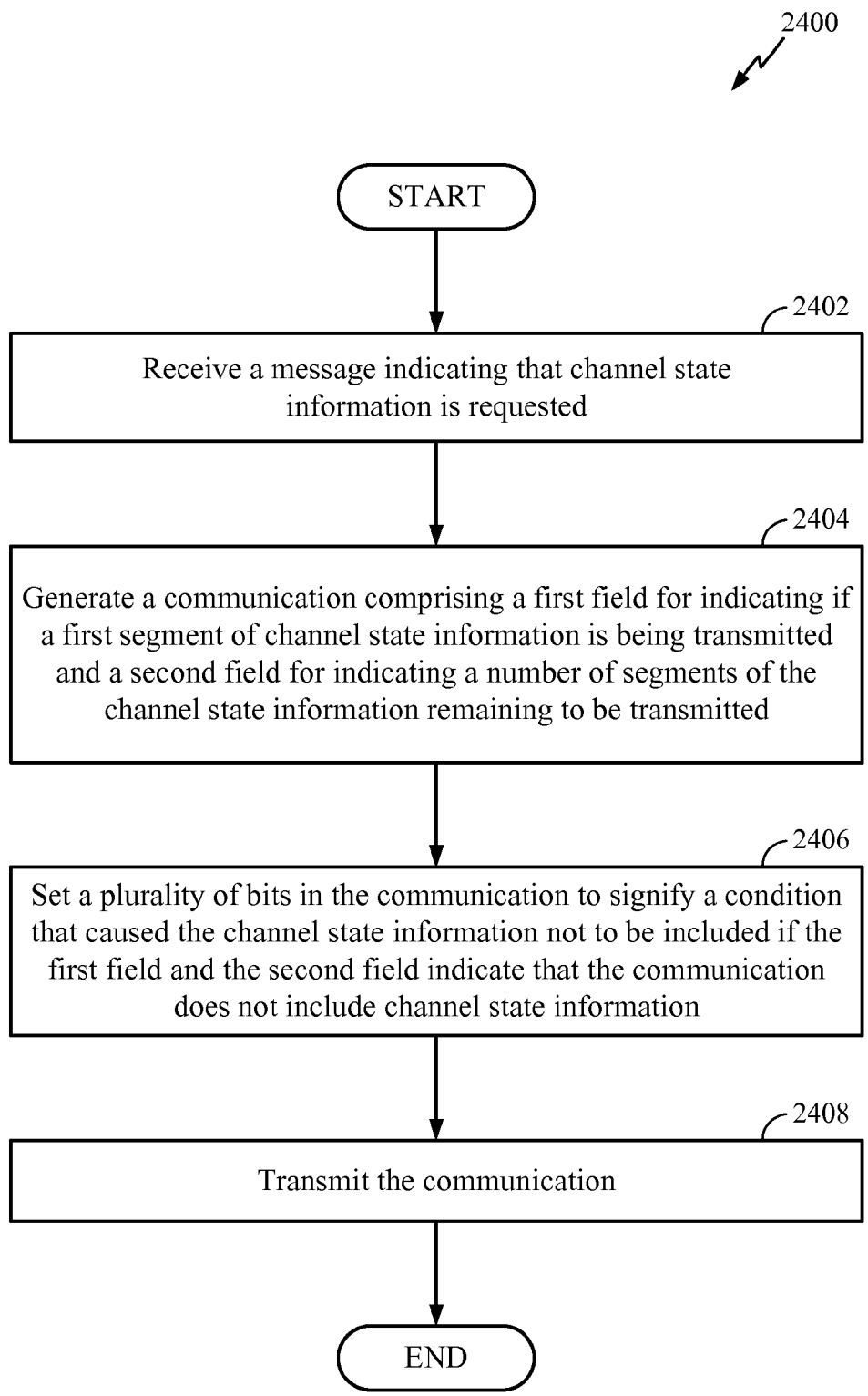
FIG. 24 illustrates an aspect of a method of communication.

FIG. 24 illustrates an aspect 2400 of a method for communication. The method may be implemented by the STA 1700, for example, to determine whether to transmit CSI, and to indicate to an AP a reason why CSI isn't being transmitted. Although the method below will be described with respect to elements of the STA 1700, those of skill in the art will appreciate that other components may be used to implement one or more of the steps described herein.

At step 2402, a message indicating that channel state information is requested is received, for example using the receiving module 1702. In some aspects, the message comprises an NDPA frame or a polling message. The message may indicate whether previously transmitted SF is stored at an AP.

Thereafter, at step 2404 a communication is generated. The communication may comprise a first field for indicating if a first segment of channel state information is being transmitted and a second field for indicating a number of segments of the channel state information remaining to be transmitted. The first and second field may be portions of a reserved field, such as a first segment field and a remaining segments field The generation may be performed by the CSI feedback module 1704, for example. The CSI feedback module 1704 may evaluate whether a channel condition has changed, whether CSI is stored at the AP, and/or whether a frame including the CSI would be too long for transmission, for example as described above. The communication may comprise CSI feedback, for example the CSI feedback 408.

Moving to step 2406, a plurality of bits in the communication is set if to signify a condition that caused the channel state information not to be included if the first field and the second field indicate that the communication does not include channel state information. The plurality of bits may signify that a previous request for channel state information was not received, that current channel state information is substantially similar to previously transmitted channel state information, or that a transmission limitation would be exceeded by transmitting the channel state information, for example. The setting of the plurality of bits may be performed by the CSI feedback module 1704, for example. The plurality of bits may be included in a control field of the CSI feedback.

At step 2408, the communication is transmitted. The communication may be transmitted using the transmitting module 1708, for example.

Those of skill in the art will appreciate that a simple and clean frame format for CSI feedback communications has been described herein. In some aspects, STA AIDs may be indicated in the NDPA. There may be no indication about a number of STAs in the NDPA in some aspects, although this information may be inferred from the length of NDPA. In some aspects, information regarding whether SF has been received or stored at an AP may be included in the NDPA. In some aspects, information regarding whether an STA is transmitting CSI is included in CSI feedback transmitted to the AP. In some aspects, a wrapper is used to indicate parameters for an STA to use when transmitting SF.

In some aspects, no field is specified for a "first responder" STA. The first listed STA-AID may implicitly represent the first responder in one aspect. NDPA and CSI Poll may carry a matching sequence number to enable STAs to match a CSI Poll to a corresponding NDPA. Similarly, the sequence number may be copied into a control field transmitted by the STA.

The various operations of methods described above may be performed by any suitable means capable of performing the corresponding functions. The means may include various hardware and/or software component(s) and/or module(s), including, but not limited to a circuit, an application specific integrate circuit (ASIC), or processor. Generally, where there are operations, module, or steps illustrated in Figures, those operations may have corresponding counterpart means-plus-function components. For example, a user terminal may comprise means for receiving a request for channel state information, means for determining parameters of the channel state information based on information included in the request, means for determining the channel state information based at least in part on the determined parameters, and means for transmitting a frame comprising at least a portion of the determined channel state information.

Figure 25:
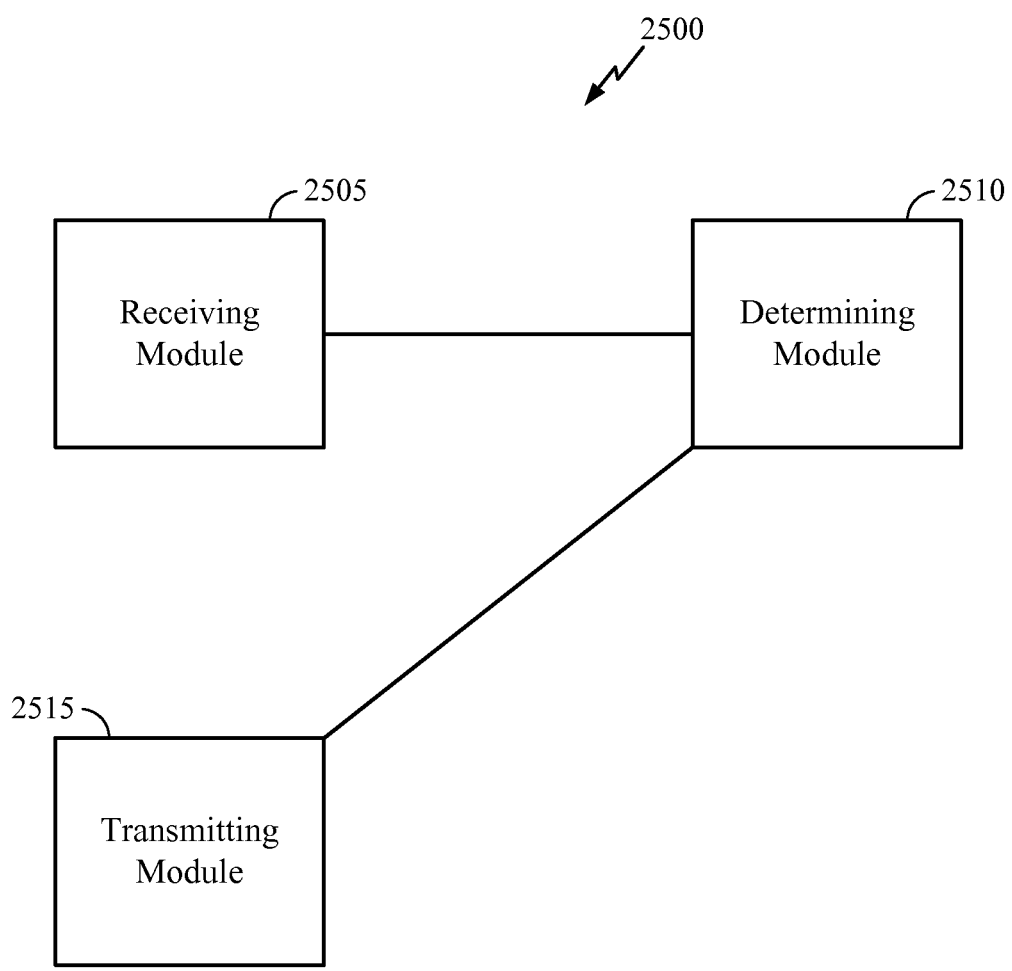
FIG. 25 illustrates a block diagram of an example user terminal in accordance with certain aspects of the present disclosure.

FIG. 25 illustrates a block diagram of an example user terminal 2500 in accordance with certain aspects of the present disclosure. User terminal 2500 comprises a receiving module 2505 which may be configured to perform the functions of the means for receiving discussed above. In some aspects, the receiving module may correspond to one or more of the receivers 254 of FIG. 2. User terminal 2500 further comprises a determining module 2510 which may be configured to perform the functions of the means for determining discussed above. In some aspects, the determining module may correspond to the controller 280 of FIG. 2. User terminal 2500 further comprises a transmitting module 2515 which may be configured to perform the functions of the means for transmitting discussed above. In some aspects, the transmitting module may correspond to one or more of the transmitters 254 of FIG. 2.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The invention claimed is:

1. A method of wireless communication, comprising:
   receiving a request for channel state information;
   determining parameters of the channel state information based on information included in the request;
   determining the channel state information based at least in part on the determined parameters; and
   transmitting a frame comprising at least a portion of the determined channel state information, wherein at least one of the parameters comprises a number of columns of a matrix for the channel state information that is requested, and wherein the request comprises a first field indicating the number.

2. The method of claim 1, wherein the request further comprises a second field indicating an association identifier of an apparatus from which the channel state information is requested.

3. The method of claim 2, wherein the second field comprises 12 bits.

4. The method of claim 2, wherein the request is received at a first apparatus, and wherein the method further comprises determining that the first apparatus is identified by the association identifier.

5. The method of claim 1, wherein the first field comprises at least 3 bits.

6. The method of claim 1, wherein at least a portion of the determined channel state information is represented as a matrix comprising a number of columns equal to the number indicated in the first field.

7. The method of claim 1, wherein the information comprises at least one bit indicating whether the channel state information will be used for a single user protocol or a multi-user protocol.

8. The method of claim 1, wherein the request comprises a null data packet announcement, the null data packet announcement comprising a sequence number, and wherein the transmitted frame comprises data indicating the sequence number.

9. The method of claim 1, wherein the transmitted frame comprises a control field indicating the determined parameters.

10. The method of claim 1, further comprising determining a bandwidth of the determined channel state information based on the determined parameters.

11. The method of claim 10, wherein the request comprises a first indicator signifying whether the channel state information is requested for single user or multi-user, and a second indicator signifying a number of columns of a matrix for the channel state information that is requested.

12. The method of claim 10, wherein the determined bandwidth is indicated in the frame.

13. The method of claim 1, further comprising:
receiving a polling message requesting an additional portion of the determined channel state information; and
transmitting an additional frame comprising the additional portion of the determined channel state information.

14. An apparatus for wireless communications, comprising:
a receiver configured to receive a request for channel state information;
a processing system configured to determine parameters of the channel state information based on information included in the request, and to determine the channel state information based at least in part on the determined parameters; and
a transmitter configured to transmit a frame comprising at least a portion of the determined channel state information, wherein at least one of the parameters comprises a number of columns of a matrix for the channel state information that is requested, and wherein the request comprises a first field indicating the number.

15. The apparatus of claim 14, wherein the request further comprises a second field indicating an association identifier of an apparatus from which the channel state information is requested.

16. The apparatus of claim 15, wherein the second field comprises 12 bits.

17. The apparatus of claim 15, wherein the processing system is further configured to determine that the apparatus is identified by the association identifier.

18. The apparatus of claim 14, wherein the first field comprises at least 3 bits.

19. The apparatus of claim 14, wherein at least a portion of the determined channel state information is represented as a matrix comprising a number of columns equal to the number indicated in the first field.

20. The apparatus of claim 14, wherein the information comprises at least one bit indicating whether the channel state information will be used for a single user protocol or a multi-user protocol.

21. The apparatus of claim 14, wherein the request comprises a null data packet announcement, the null data packet announcement comprising a sequence number, and wherein the transmitted frame comprises data indicating the sequence number.

22. The apparatus of claim 14, wherein the transmitted frame comprises a control field indicating the determined parameters.

23. The apparatus of claim 14, wherein the processing system is configured to determine a bandwidth of the determined channel state information based on the determined parameters.

24. The apparatus of claim 23, wherein the request comprises a first indicator signifying whether the channel state information is requested for single user or multi-user, and a second indicator signifying a number of columns of a matrix for the channel state information that is requested.

25. The apparatus of claim 23, wherein the determined bandwidth is indicated in the frame.

26. The apparatus of claim 14, wherein the receiver is further configured to receive a polling message requesting an additional portion of the determined channel state information, and wherein the transmitter is further configured to transmit an additional frame comprising the additional portion of the determined channel state information.

27. An apparatus for wireless communications, comprising:
means for receiving a request for channel state information;
means for determining parameters of the channel state information based on information included in the request;
means for determining the channel state information based at least in part on the determined parameters; and
means for transmitting a frame comprising at least a portion of the determined channel state information, wherein at least one of the parameters comprises a number of columns of a matrix for the channel state information that is requested, and wherein the request comprises a first field indicating the number.

28. The apparatus of claim 27, wherein the request further comprises a second field indicating an association identifier of an apparatus from which the channel state information is requested.

29. The apparatus of claim 28, wherein the second field comprises 12 bits.

30. The apparatus of claim 28, wherein the apparatus further comprises means for determining that the apparatus is identified by the association identifier.

31. The apparatus of claim 27, wherein the first field comprises at least 3 bits.

32. The apparatus of claim 27, wherein at least a portion of the determined channel state information is represented as a matrix comprising a number of columns equal to the number indicated in the first field.

33. The apparatus of claim 27, wherein the information comprises at least one bit indicating whether the channel state information will be used for a single user protocol or a multi-user protocol.

34. The apparatus of claim 27, wherein the request comprises a null data packet announcement, the null data packet announcement comprising a sequence number, and wherein the transmitted frame comprises data indicating the sequence number.

35. The apparatus of claim 27, wherein the transmitted frame comprises a control field indicating the determined parameters.

36. The apparatus of claim 27, further comprising means for determining a bandwidth of the determined channel state information based on the determined parameters.

37. The apparatus of claim 36, wherein the request comprises a first indicator signifying whether the channel state information is requested for single user or multi-user, and a second indicator signifying a number of columns of a matrix for the channel state information that is requested.

38. The apparatus of claim 36, wherein the determined bandwidth is indicated in the frame.

39. The apparatus of claim 27, further comprising:
   means for receiving a polling message requesting an additional portion of the determined channel state information; and
   means for transmitting an additional frame comprising the additional portion of the determined channel state information.

40. A computer program product for wirelessly communicating comprising a non-transitory computer readable medium comprising instructions that when executed cause an apparatus to:
   receive a request for channel state information;
   determine parameters of the channel state information based on information included in the request;
   determine the channel state information based at least in part on the determined parameters; and
   transmit a frame comprising at least a portion of the determined channel state information, wherein at least one of the parameters comprises a number of columns of a matrix for the channel state information that is requested, and wherein the request comprises a field indicating the number.

41. An access terminal, comprising:
   at least one antenna;
   a receiver configured to receive, via the at least one antenna, a request for channel state information;
   a processing system configured to determine parameters of the channel state information based on information included in the request, and to determine the channel state information based at least in part on the determined parameters; and
   a transmitter configured to transmit a frame comprising at least a portion of the determined channel state information, wherein at least one of the parameters comprises a number of columns of a matrix for the channel state information that is requested, and wherein the request comprises a field indicating the number.

* * * * *